(12) United States Patent
Agrawal et al.

(10) Patent No.: US 7,849,135 B2
(45) Date of Patent: Dec. 7, 2010

(54) SHARING CONTENT ON MOBILE DEVICES

(75) Inventors: Anuraag Agrawal, Bellevue, WA (US);
Jeff Yee, Sammamish, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1310 days.

(21) Appl. No.: 10/821,608

(22) Filed: Apr. 9, 2004

(65) Prior Publication Data

US 2005/0266835 A1    Dec. 1, 2005

(51) Int. Cl.
*G06F 15/16* (2006.01)

(52) U.S. Cl. .................. 709/204; 709/231; 709/232; 455/457; 455/466; 455/517; 715/700; 715/854

(58) Field of Classification Search .................. 709/231, 709/232, 204
See application file for complete search history.

(56) References Cited

U.S. PATENT DOCUMENTS

| | | | | |
|---|---|---|---|---|
| 3,576,951 A | * | 5/1971 | Uchida et al. ................ | 379/249 |
| 5,852,657 A | * | 12/1998 | Malik et al. ............... | 379/93.25 |
| 6,047,327 A | * | 4/2000 | Tso et al. .................... | 709/232 |
| 6,097,793 A | * | 8/2000 | Jandel ..................... | 379/93.23 |
| 6,212,550 B1 | | 4/2001 | Segur | |
| 6,259,471 B1 | * | 7/2001 | Peters et al. ............. | 348/14.12 |
| 6,400,958 B1 | * | 6/2002 | Isomursu et al. ........... | 455/466 |
| 6,456,854 B1 | * | 9/2002 | Chern et al. ................ | 455/457 |
| 6,507,643 B1 | * | 1/2003 | Groner .................... | 379/88.14 |
| 6,771,975 B1 | * | 8/2004 | Shin .......................... | 455/466 |
| 6,879,997 B1 | | 4/2005 | Ketola et al. | |
| 6,907,239 B1 | * | 6/2005 | Sivula ........................ | 455/406 |
| 6,965,770 B2 | * | 11/2005 | Walsh et al. ............. | 455/426.1 |
| 6,996,393 B2 | | 2/2006 | Pyhalammi et al. | |
| 7,020,685 B1 | * | 3/2006 | Chen et al. .................. | 709/204 |
| 7,043,238 B2 | * | 5/2006 | Ahn et al. ................ | 455/432.1 |

(Continued)

FOREIGN PATENT DOCUMENTS

JP    2001057599    *    2/2001

OTHER PUBLICATIONS

Freeze, Jill T, Sams Teach Yourself Microsoft Internet Explorer 5 in 24 Hours, 1999, Sams Publishing, pp. 21,101-103,214-220.*

(Continued)

*Primary Examiner*—John Follansbee
*Assistant Examiner*—Backhean Tiv
(74) *Attorney, Agent, or Firm*—Woodcock Washburn LLP

(57) ABSTRACT

Sharing content among users of mobile devices is facilitated by a system and method that employs a content sharing application to receive requests to share content with one or more users of mobile devices. Content providers provide some of the information in such requests to share content by including, in addition to the content, links or other user-selectable options to share the content. A provided application program interface makes it easy for content providers to participate. Users of devices such as personal computers or mobile devices browse content and select content to share with friends or other users of mobile devices using an intuitive interface. Recipients of shared content receive messages from the content sharing application indicating that they have been selected to receive shared content. Such messages may provide direct or indirect access to the shared content via the recipient mobile device.

40 Claims, 15 Drawing Sheets

U.S. PATENT DOCUMENTS

| | | | |
|---|---|---|---|
| 7,062,255 B2 | 6/2006 | Nakanaga | |
| 7,116,995 B2 | 10/2006 | Savinen et al. | |
| 7,127,232 B2 | 10/2006 | O'Neil et al. | |
| 7,165,224 B2 | 1/2007 | Pyhalammi | |
| 7,167,710 B2 | 1/2007 | Thakkar et al. | |
| 7,200,680 B2* | 4/2007 | Evans et al. | 709/246 |
| 7,206,806 B2* | 4/2007 | Pineau | 709/203 |
| 7,216,109 B1* | 5/2007 | Donner | 705/64 |
| 7,272,637 B1* | 9/2007 | Himmelstein | 709/217 |
| 7,277,733 B2* | 10/2007 | Ko et al. | 455/566 |
| 7,317,908 B1* | 1/2008 | Eason | 455/413 |
| 7,343,168 B2* | 3/2008 | Valloppillil | 455/466 |
| 7,369,868 B2* | 5/2008 | Dunko et al. | 455/517 |
| 7,370,077 B2* | 5/2008 | Pradhan et al. | 709/204 |
| 7,519,720 B2* | 4/2009 | Fishman et al. | 709/230 |
| 7,584,225 B2* | 9/2009 | Jiang et al. | 1/1 |
| 7,590,681 B1* | 9/2009 | Chang et al. | 709/203 |
| 2001/0048738 A1* | 12/2001 | Baniak et al. | 379/201.02 |
| 2002/0026500 A1* | 2/2002 | Kanefsky et al. | 709/219 |
| 2002/0073149 A1* | 6/2002 | Young | 709/204 |
| 2002/0107982 A1 | 8/2002 | Teodosiu et al. | |
| 2002/0137507 A1* | 9/2002 | Winkler | 455/426 |
| 2002/0177454 A1* | 11/2002 | Karri et al. | 455/466 |
| 2003/0026432 A1* | 2/2003 | Woodward | 380/278 |
| 2003/0040327 A1* | 2/2003 | Park | 455/466 |
| 2003/0087648 A1* | 5/2003 | Mezhvinsky et al. | 455/456 |
| 2003/0091016 A1* | 5/2003 | Ko et al. | 370/338 |
| 2003/0100322 A1* | 5/2003 | Jeon | 455/466 |
| 2003/0103607 A1* | 6/2003 | Feakes | 379/88.17 |
| 2003/0109247 A1* | 6/2003 | Lindgren et al. | 455/412 |
| 2003/0182242 A1* | 9/2003 | Scott et al. | 705/65 |
| 2003/0186680 A1* | 10/2003 | Bhasin et al. | 455/411 |
| 2003/0191709 A1* | 10/2003 | Elston et al. | 705/40 |
| 2003/0191816 A1* | 10/2003 | Landress et al. | 709/219 |
| 2003/0217159 A1* | 11/2003 | Schramm-Apple et al. | 709/228 |
| 2003/0220835 A1* | 11/2003 | Barnes, Jr. | 705/14 |
| 2004/0039781 A1* | 2/2004 | LaVallee et al. | 709/205 |
| 2004/0073691 A1* | 4/2004 | Sun | 709/230 |
| 2004/0087326 A1* | 5/2004 | Dunko et al. | 455/517 |
| 2004/0132431 A1* | 7/2004 | Vandermeijden et al. | 455/412.2 |
| 2004/0138943 A1* | 7/2004 | Silvernail | 705/10 |
| 2004/0139163 A1* | 7/2004 | Adams et al. | 709/206 |
| 2004/0143667 A1* | 7/2004 | Jerome | 709/228 |
| 2004/0148351 A1* | 7/2004 | Cotte | 709/205 |
| 2004/0176067 A1* | 9/2004 | Lakhani et al. | 455/406 |
| 2004/0186883 A1* | 9/2004 | Nyman et al. | 709/203 |
| 2004/0193691 A1* | 9/2004 | Chang | 709/206 |
| 2004/0224723 A1* | 11/2004 | Farcasiu | 455/557 |
| 2004/0229656 A1* | 11/2004 | Takahashi et al. | 455/566 |
| 2005/0015443 A1* | 1/2005 | Levine et al. | 709/204 |
| 2005/0031106 A1* | 2/2005 | Henderson | 379/142.17 |
| 2005/0137984 A1* | 6/2005 | Nguyen et al. | 705/51 |
| 2005/0138193 A1* | 6/2005 | Encarnacion et al. | 709/230 |
| 2005/0144251 A1* | 6/2005 | Slate | 709/215 |
| 2005/0160001 A1* | 7/2005 | Lapre et al. | 705/14 |
| 2005/0227678 A1* | 10/2005 | Agrawal et al. | 455/414.3 |
| 2005/0229118 A1* | 10/2005 | Chiu et al. | 715/864 |
| 2005/0246193 A1* | 11/2005 | Roever et al. | 705/1 |
| 2005/0266835 A1* | 12/2005 | Agrawal et al. | 455/414.3 |
| 2006/0014490 A1 | 1/2006 | Kopra et al. | |
| 2006/0014523 A1 | 1/2006 | Reilly | |
| 2006/0026534 A1* | 2/2006 | Ruthfield et al. | 715/854 |
| 2006/0095502 A1* | 5/2006 | Lewis et al. | 709/203 |
| 2006/0116167 A1* | 6/2006 | Raviv et al. | 455/558 |
| 2006/0168004 A1* | 7/2006 | Choe et al. | 709/206 |
| 2006/0168095 A1* | 7/2006 | Sharma et al. | 709/217 |
| 2006/0291455 A1* | 12/2006 | Katz et al. | 370/355 |
| 2007/0027921 A1 | 2/2007 | Alvarado et al. | |
| 2007/0083408 A1* | 4/2007 | Altberg et al. | 705/7 |
| 2008/0141128 A1* | 6/2008 | Takahashi et al. | 715/700 |
| 2008/0153468 A1* | 6/2008 | Reilly | 455/414.2 |
| 2008/0212944 A1* | 9/2008 | Khedouri et al. | 386/124 |
| 2009/0053995 A1* | 2/2009 | Moore, III | 455/13.1 |
| 2009/0191904 A1* | 7/2009 | Hronek et al. | 455/466 |

OTHER PUBLICATIONS

CNN.com, Jan. 29, 2003.*
Fielding, "RFC 2616" Jun. 1999, IETF, 165 pages.
In the United States Patent and Trademark Office, in re.: U.S. Appl. No. 10/821,325, filed Apr. 9, 2004, Final Office Action Due dated Nov. 26, 2008, 50 pages.
In the United States Patent and Trademark Office, in re.: U.S. Appl. No. 10/821,325, filed Apr. 9, 2004, Non-Final Office Action dated Apr. 30, 2008, 44 pages.
In the United States Patent and Trademark Office, in re.: U.S. Appl. No. 10/821,325, filed Apr. 9, 2004, Non-Final Office Action dated Mar. 18, 2009, 51 pages.
In the United States Patent and Trademark Office, in re.: U.S. Appl. No. 10/821,325, filed Apr. 9, 2004, Notice of Allowance and Fee(s) Due dated Oct. 2, 2009, 17 pages.
WAP Push Message, "Wireless Application Protocol Push Message Specification," Aug. 16, 1999, WAP Forum, 13 pages.

* cited by examiner

SHARING CONTENT ON MOBILE DEVICES

CROSS-REFERENCE TO RELATED APPLICATION(S)

This application is related to the following commonly assigned U.S. patent applications: U.S. patent application Ser. No. 10/822,187, filed Apr. 9, 2004, entitled "Spam Control for Sharing Content on Mobile Devices" and U.S. patent application Ser. No. 10/821,325, filed Apr. 9, 2004, entitled "Managing Differences in User Devices When Sharing Content on Mobile Devices," both herein incorporated by reference.

BACKGROUND

Content providers are increasingly offering content to subscribers of mobile wireless services. For example, mobile wireless service providers and others are offering wireless portals through which users of mobile devices can access content such as news, entertainment, and email services—the possibilities for content are endless. In addition, content providers that in the past have tailored their content for users of traditional web browsers are increasingly providing alternative formats for users of mobile devices.

The mobile devices of today, while much advanced, are typically small with limited input capabilities and navigation capabilities. For this reason, content intended for users of such devices is sometimes subject to special formatting and protocols. Another problem content providers struggle with is marketing their content to users of mobile devices. For example, because of the limited input/output capabilities of most wireless devices, it is difficult for the mobile end user to search for and identify new and interesting content. Very often, the best application or content is made known by "word of mouth." For example, a friend or colleague may recommend a particular mobile application. In doing so, he or she has to remember and describe where the content was found, which may not always be easy or practical.

Users of personal computers have been known to share content by sending a URL via email. For example, a user can copy a URL from a web browser and email it to a friend, or use a "send to" feature provided by a web browser, which then imports the URL to a specially configured email application. The user then creates and addresses the email message and sends it to the friend. Because this method of sharing content involves multiple steps, multiple applications running on the user's device, and, possibly, complicated user input events such as "cutting and pasting," it would be difficult to implement and use on mobile devices. Moreover, given the wide range of mobile devices, there is no way to assure that a particular application or link sent via email will be accessible from a user's particular mobile device. In addition, because users typically receive many emails and spend significant amounts of time opening and assessing the content of emails, sending links to content by email is not efficient. These are only some of the problems with sending and receiving URL, with respect to mobile devices, many others exist.

SUMMARY

The method and system described herein allows users of mobile devices to share content with other users via mobile messaging and other similar techniques. In one embodiment, a content provider provides a link to enable the process of sharing content, which may appear on the content page itself or on multiple content pages, and may be configured to be readable by one or more applications running on a content sharing system. In another embodiment, a system may receive a request message which is generated by a content provider and includes information identifying the content sharing system and the content selected by a user that the user wishes to share with a recipient. The system may provide a user input form to the user, where the user identifies the recipient, and may receive the user input information via the user input form. Based on the received information, the system may generate a content share message for transmittal to the mobile device of the recipient that includes an indication of the identified content that the user wishes to share, so that the content can be presented on the mobile device of the recipient. In another embodiment, an application may check for device compatibility before sending a content share message, and only send compatible content to the recipient's device, optionally sending alternative content if the recipient's device is not compatible with the share content. By providing an easy-to-use interface and features, the present system and method make sharing content easier and more efficient for users.

Figure 1:
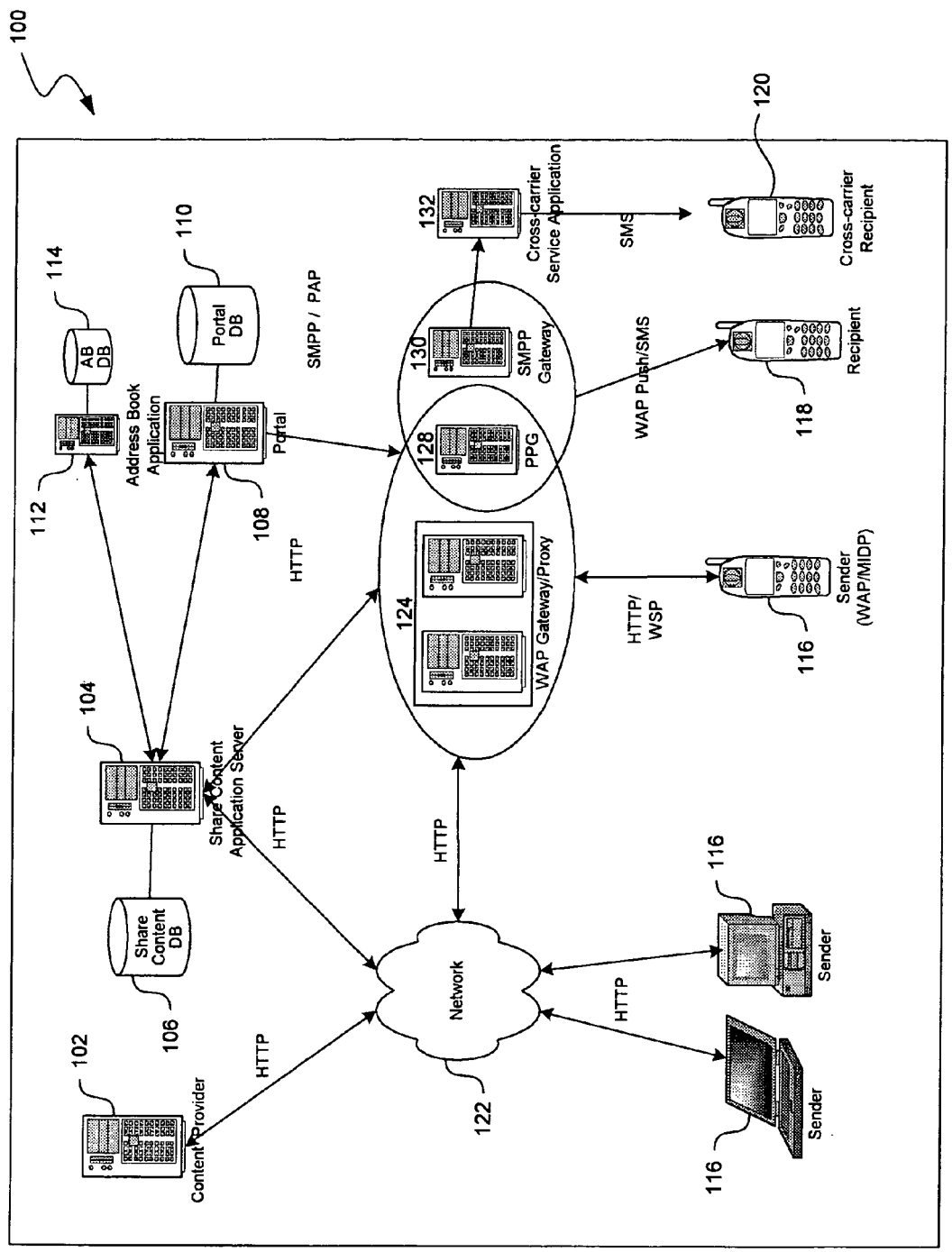
FIG. 1 is a block diagram showing an example of a system for sharing content under one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The method and system described herein allows users of mobile devices to share content with other users via mobile messaging and other similar techniques. For example, a user of a mobile device finds interesting content and wants to send it to a friend. The user identifies the friend using a mobile device. The user's friend then receives a content link via a message. The message may include a brief description that tells the friend about the content. In some embodiments, the message is a WAP (wireless application protocol) push message generated by a system associated with the user's mobile service provider. The friend can then choose to act upon the received message by loading the URL or can ignore it or delete it.

In some embodiments, the content provider provides a link to enable the process of sharing the content. This link may appear on the content page itself, or on multiple content pages, and may be configured to be readable by one or more applications running on a content sharing system, which may be associated with the user's mobile service provider or may be independent. In some implementations, selecting this link will take the user to a form that prompts the user to enter the friend's mobile phone number. The format of the provided link may be defined using an application program interface provided by a mobile service provider (or other service provider). This application program interface is compatible with a content sharing application implemented by the service provider. This content sharing application handles many of the processes used to share the content amongst users of the mobile devices. In this way, it is very easy for content providers or content partners to integrate the API and thereby facilitate the sharing of content amongst users.

In general, by providing an easy-to-use interface and features, the content sharing application makes sharing content easy for users. It helps to overcome difficulties associated with the limited input capabilities of small devices. For example, to make it easy for the user to identify the friend, the content sharing application may provide a list of "recent numbers" to the mobile device so that the user can easily pick from them to identify his or her friend. The content sharing application may allow for integration with a network-based address book application (or other address book application). Once the user enters the friend's mobile phone number and submits the form, the content sharing system may perform validation on the friend. For example, it may check to see if the friend's device is capable of receiving the message. Once this validation is successfully performed, the content sharing system may then compose a message and send it to the friend's mobile device.

The content sharing application makes it easy for recipients to access the shared content and provides an intuitive interface. For example, upon receipt of the message, the friend sees the sender's phone number, name, and a brief message with the application name, etc. The friend then has the option to load the content, delete the message, or ignore the message. If WAP push messaging is used, the friend can conveniently load a URL associated with the content. In some embodiments, potential recipients of such messages can use an opt-out mechanism to avoid receiving any such messages. This privacy management for the recipients can be global or user specific. For example, a user may opt out of receiving messages regardless of the sender, may block messages coming from all but a select list of users, or may receive all messages except for those on a blocked list.

Some of the content that users want to share may not be applicable or may not work on a recipient's device. The application will also check the device compatibility of the content before sending the alert. If the device is compatible, then the link will be sent; otherwise, as per the content's preference, another link that is applicable to the device will be sent.

Because there can be many benefits to sharing content among users, the sharing of content by users may be encouraged and tracked. In addition, content providers are encouraged to offer share content links to there users. In some cases, a wireless service provider associated with the content sharing application may charge for certain services. For example, it may charge content providers for the use of the API. It may also charge users for the sending or receipt of share content messages. For example, a recipient who receives a share content message is charged for the applicable data usage and/or SMS billing. The wireless service provider may also encourage sharing by offering incentives to users.

II. Representative System

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network. In a distributed computing environment, program modules may be located in both local and remote memory storage devices.

Aspects of the invention may be stored or distributed on computer-readable media, including magnetically or optically readable computer discs, such as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a system 100 on which the content sharing scheme can be implemented provides various networked components. These components include one or more content providers 102, a share content application 104 and database 106, a wireless portal 108 and database 110, and, optionally, an address book application 112 and database 114. The system 100 also includes various end user components, including content sender devices 116 (e.g., mobile device, laptop, PC, etc., with browser), content recipient devices 118 (e.g., WAP-enabled mobile device, SMS-enabled mobile device, etc.), and cross-carrier recipient devices 120. Details regarding the functionality of the components of FIG. 1 are described in detail below.

These various components communicate via one or more networks 122. For example, the system 100 may include a wireless network. Examples of wireless telecommunication networks include UMTS (universal mobile telecommunication system), GSM (global system for mobile communications) (possibly including GPRS (general packet radio service), EDGE (enhanced data rates for GSM evolution), etc.), CDMA (code division multiple access), IS-136, analog, etc. The system may also include various wired or partially wired networks, such as the Internet, a wired LAN (local area network), or even a public switched telephone network (PSTN). While not all types of networks are described herein, the invention may be implemented within the framework of many types of networks.

In some embodiments, the share content application 104, along with the various gateway components, is configured to communicate within more than one of the above described communication networks. For example, the share content application 104 may be accessed via a personal computer or laptop using a wired or partially wired public communication network (i.e., the Internet). It can also be accessed via a telecommunication network, such as one of the wireless or wired networks described above.

To facilitate and manage network communications, the system 100 may include various communication gateways and related applications. For example, the share content application 104 and the content sender devices 116 communicate via a WAP gateway/proxy 124, and a push proxy gateway 128. Content recipient devices 118 may receive WAP push messages via the push proxy gateway 128 and a short message peer-to-peer gateway 130. Cross-carrier content recipient devices 120 may receive messages via a short message peer-to-peer gateway 130 used in conjunction with a cross-carrier service application 132. In general, any "cross-carrier" component refers to a component operated by a telecommunications carrier that differs from a telecommunications carrier operating the other components of FIG. 1.

Via this combination of networks and gateways, the share content application 104 may establish communication links on many different types of networks, with many different types of devices, including cross-carrier devices. In some embodiments, the share content application 104 runs on, or in association with, the system of a wireless service provider or wireless carrier. Accordingly, many of its capabilities may be based on information associated with its subscribers (customers).

Figure 2:
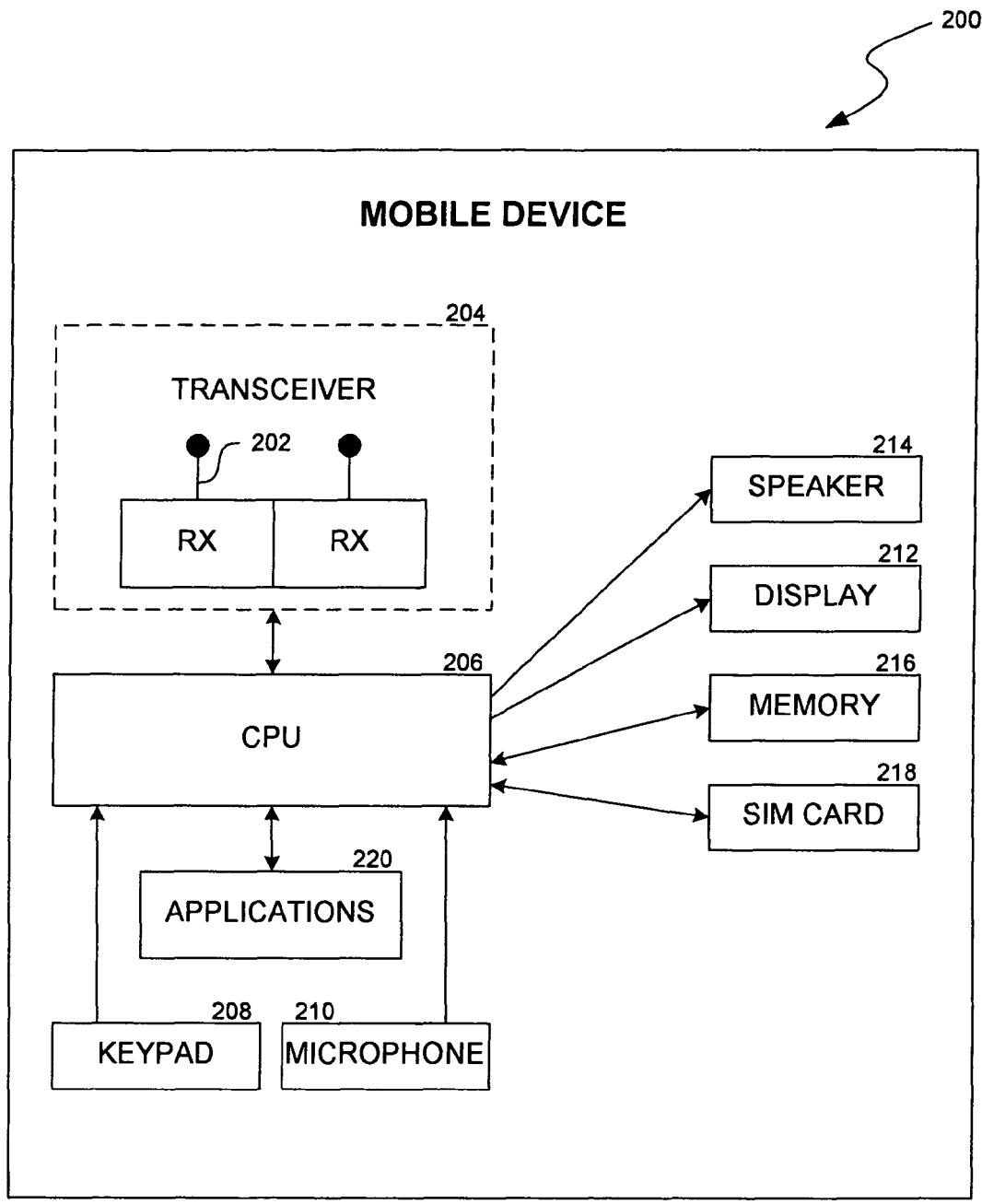
FIG. 2 is a block diagram showing an example implementation of the mobile devices of FIG. 1.

FIG. 2 shows a block diagram of a typical mobile communication device 200, such as a mobile handset. This device is representative of both the content sender device 116 and content recipient devices (118 and 120) of FIG. 1. While a mobile phone is shown as the mobile communication device in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer may provide input to the processor unit 206 via a keypad 208, microphone 210, or display/touchpad 212. In turn, the processor unit 206 may provide information to the customer via the display/touchpad 212 or a speaker 214.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communication systems, or other well-known memory storage technologies, such as "smart cards." Applications 220 such as wireless content browser applications and address book applications could be implemented in either the removable memory 218 or the nonremovable memory 216.

III. System Flows

FIGS. 3 through 9 are representative flow diagrams that show processes that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Figure 3:
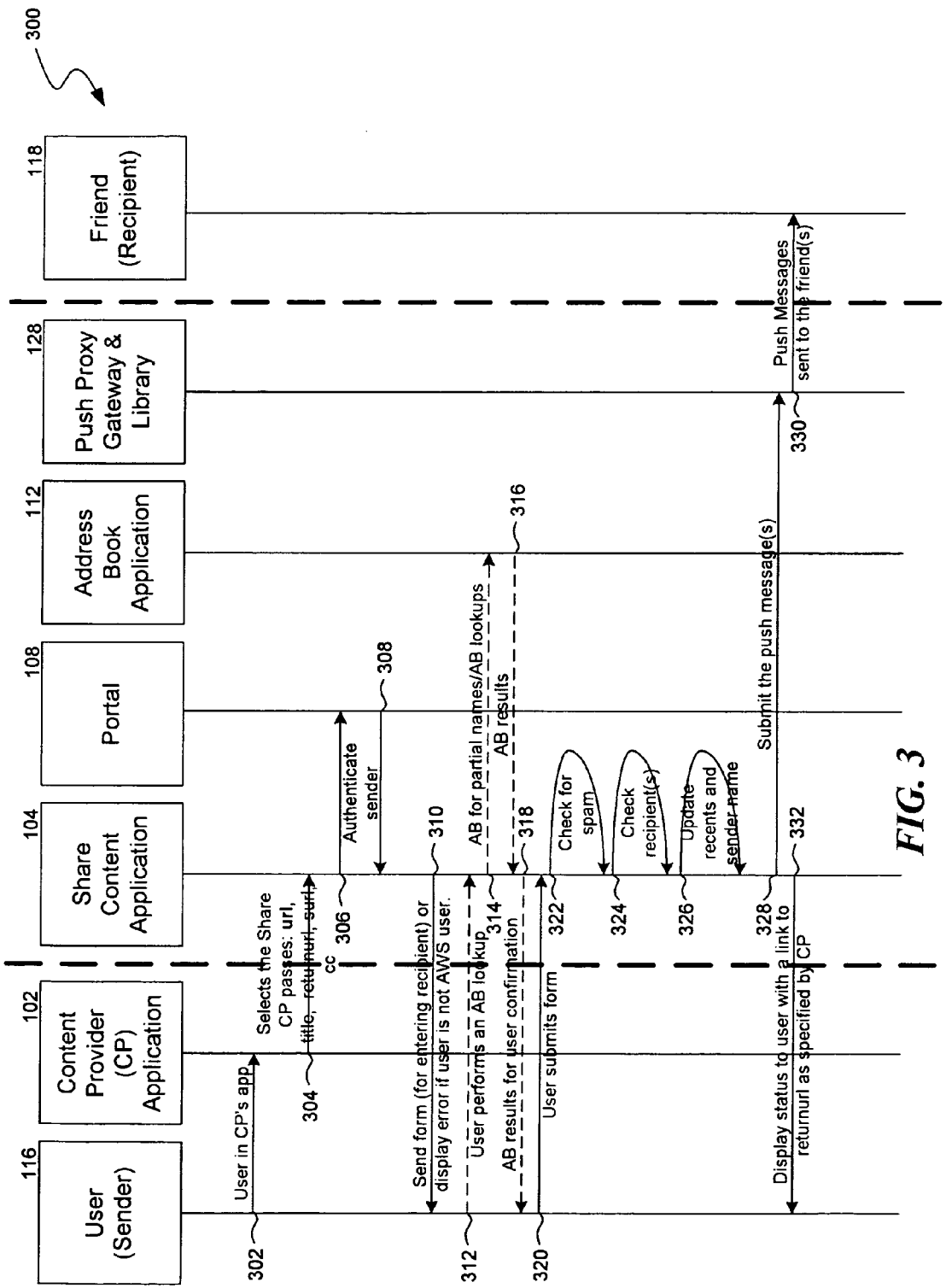
FIG. 3 is a flow diagram showing a high-level transaction flow between various components of the system of FIG. 1.
Figure 4:
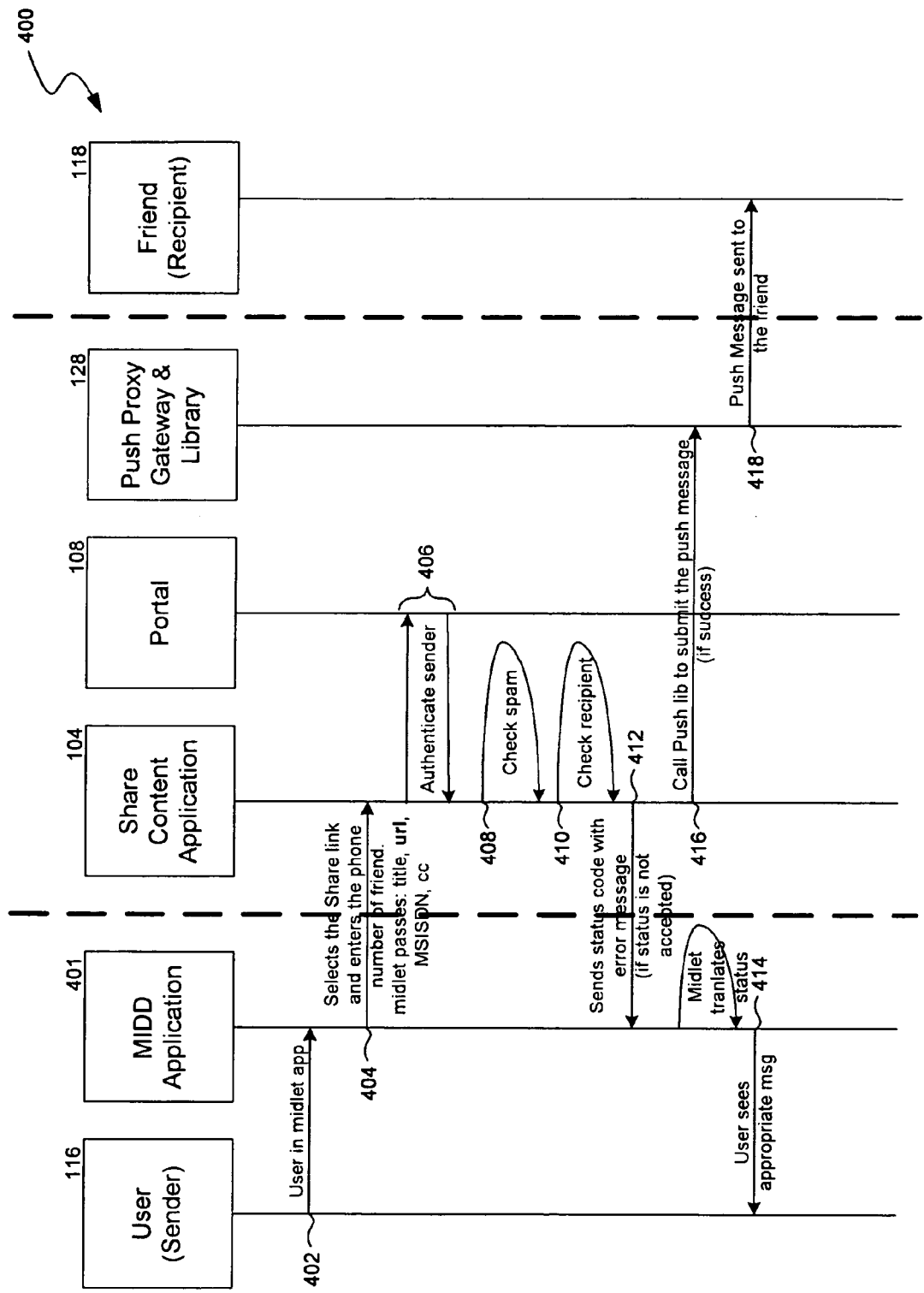
FIG. 4 is a flow diagram showing an alternative high-level transaction flow between various components of the system of FIG. 1 involving an MIDP application user.

The flows represented in FIGS. 3 and 4 are high-level flows in which the entire transaction is shown from initiation to completion. Some of the individual processes or subtransactions are described in more detail in the Figures that follow. The various entities that may be involved in the transaction are also depicted in FIG. 1 and include the content sender device 116, the content provider 102, the share content application 104, the wireless portal 108, the address book application 112, various components of the push proxy gateway 128, and the content recipient device 118.

Referring to FIG. 3, a share content transaction 300 for WAP-enabled devices is shown from initiation to completion. At a subtransaction 302 a user of the content sender device 116 selects to share content provided by the content provider 102. At a subtransaction 304 the share content application 104 receives various parameters associated with the content to be shared. The types of information that may be included as parameters are described in more detail below in the section entitled "Application Program Interface and Platforms." In some embodiments, the parameters are sent in the form of an HTTP GET request that is created by the content provider 102 and accessed by the user of the content sender device 116 as a hyperlink on a content page. At a subtransaction 306, the share content application 104 receives the share content request and authenticates the user of the content sender device 116. In the case where users are selecting to share content from a PC, the portal may provide the appropriate user information so that the share content application 104 can perform this verification subtransaction.

Once the user is authenticated, at a subtransaction 310, the content sender device 116 receives a user input form from the share content application 104. If authentication of the user fails, the user sees an error message on the device instead of the user input form. The user may also see this error message if the content provider 102 fails to provide certain parameters (e.g., url or surl, described below).

At a subtransaction 312, the user performs an optional address book lookup function via the share content application 104. At a subtransaction 314, the share content application 104 may optionally invoke the address book application 112, which, at a subtransaction 316, performs a query of the database 114 and provides results to the share content application 104. At a subtransaction 318, the share content application 104 sends results of the address book lookup to the content sender device so it can be displayed to the user and the user can select or enter the appropriate entries. The address book lookup is described in more detail with respect to FIG. 15.

After the user has completed the input form, at a subtransaction 320, the content sender device 116 submits the completed form to the share content application 104. At a subtransaction 322, the share content application 104 may check for spam, a process that is described in more detail in U.S. patent application Ser. No. 10/822,187 (incorporated by reference). At a subtransaction 324, the share content application 104 checks the recipient status to determine whether each specified content recipient device 118 subscribes to a service associated with the share content application 104 or is a cross-carrier recipient. At this transaction, the share content application 104 may also check for information about the recipient devices to determine whether they may be compatible with the content or applications to be shared, a process that is described in more detail in U.S. patent application Ser. No. 10/821,325 (incorporated by reference).

At a subtransaction 326, a "recents" list may be updated with the latest recipient information. This list may be stored at the share content application 104 and may include a list of names or MSISDNs (mobile station ISDN number) most recently contacted by the user.

At a subtransaction 328, the share content application 104 communicates with various components of the push proxy gateway 128 to establish a WAP push message for each of the eligible content recipient devices 118. In some embodiments, a single push proxy gateway address will resolve users on all available gateways available in the network. At a subtransaction 330, the WAP push message(s) are sent to the content recipient device(s) 118. In this way, the user of a content recipient device 118 is directed to the content (e.g., a URL). At a subtransaction 332, the content sharing application 104 sends a status page to the content sender device 116. This may include return URL information so that the user can automatically be taken back to the content that he or she originally selected for sharing.

In the case where the recipient device is not WAP-enabled or does not support receiving WAP push messages, similar subtransactions may be implicated with the result being that an SMS message is sent to the recipient device in place of a WAP push. Alternatively, other message types may be employed.

A slightly different high-level flow may occur when the system handles content including J2ME (Java 2 platform micro edition) applications (i.e., MIDP (mobile information device profile)) and similar applications that do not typically launch browsers. In such cases, the share content application 104 may perform code-injections. If the share content application 104 is not configured to perform code-injections, the system may alternatively rely on a MIDP application 401 (e.g., MIDlet) to capture the content recipient device's address information and submit it to the share content application 104, as illustrated in a transaction flow 400 of FIG. 4.

Referring to FIG. 4, in a subtransaction 402, the MIDP application 401 manages the display of the user input form. At a subtransaction 404, the MIDP application 401 passes information from the input form (e.g., the content recipient's MSISDN) to the share content application 104. At a subtransaction 406, the share content application 104 performs authentication of the user associated with the content sender device 116. This may occur via subtransactions with the wireless portal 108.

At a subtransaction 408, the share content application 104 may check for spam. This may include checking to see if the user associated with the content sender device has exceeded a threshold for sending messages. At a subtransaction 410, the share content application 104 checks the recipient status to determine whether each specified content recipient device 118 subscribes to a service associated with the share content application 104 or is a cross-carrier recipient. At subtransaction 412, the share content application 104 sends a status code to the MIDP application 401, indicating the status of the checks performed at the share content application 104. At subtransaction 414, the MIDP application 401 may pass this information on as a message to the content sender device 116. Meanwhile, the share content application 104 at subtransaction 416 communicates with various components of the push proxy gateway 128 to establish a WAP push message for each of the eligible content recipient devices 118. At a subtransaction 418, the WAP push message(s) are sent to the content recipient device(s) 118.

Figure 5:
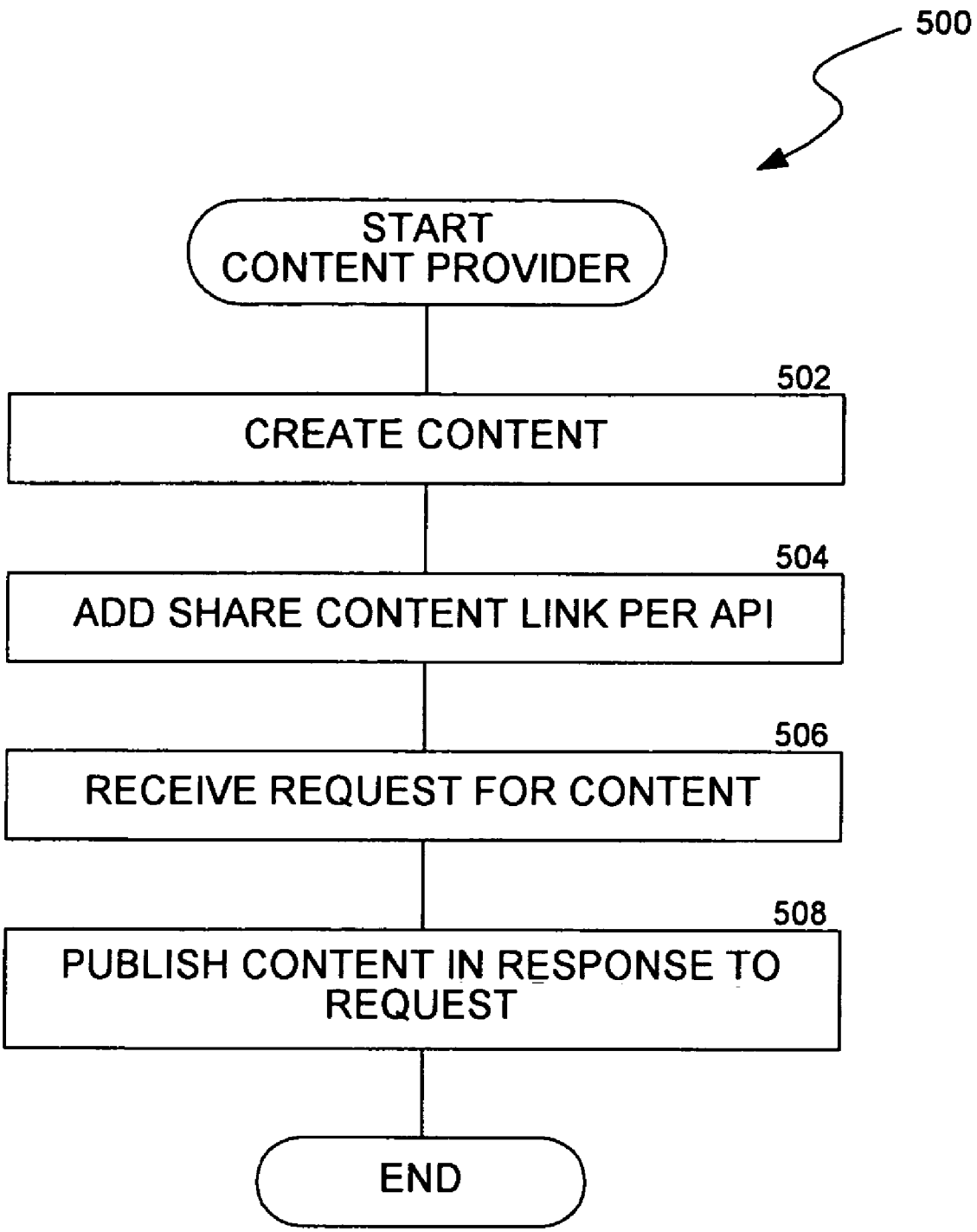
FIG. 5 is a flow diagram showing a routine for implementing the content sharing technique, where the routine is performed at the content provider of FIG. 1.

FIGS. 5 through 8 provide more detailed flows of routines or processes performed at the various components of the system 100 of FIG. 1 and described at a high level in FIGS. 3 and 4. Referring to FIG. 5, a process 500 performed at the content provider 102 begins at block 502 where the content provider creates content.

At block 504, the content provider adds a share content link to the content. The share content link is created using an API (application program interface) recognized by the content sharing application, described in more detail below. In some embodiments, the content provider may provide the link at the bottom of a display page, such as a page provided via the Internet or via a wireless portal.

At block 506 the content provider receives a request for content from a user, such as the user of the content sender device 116 of FIG. 1. At block 508, the content provider publishes the content (including the link) in response to the request from the user.

Figure 6:
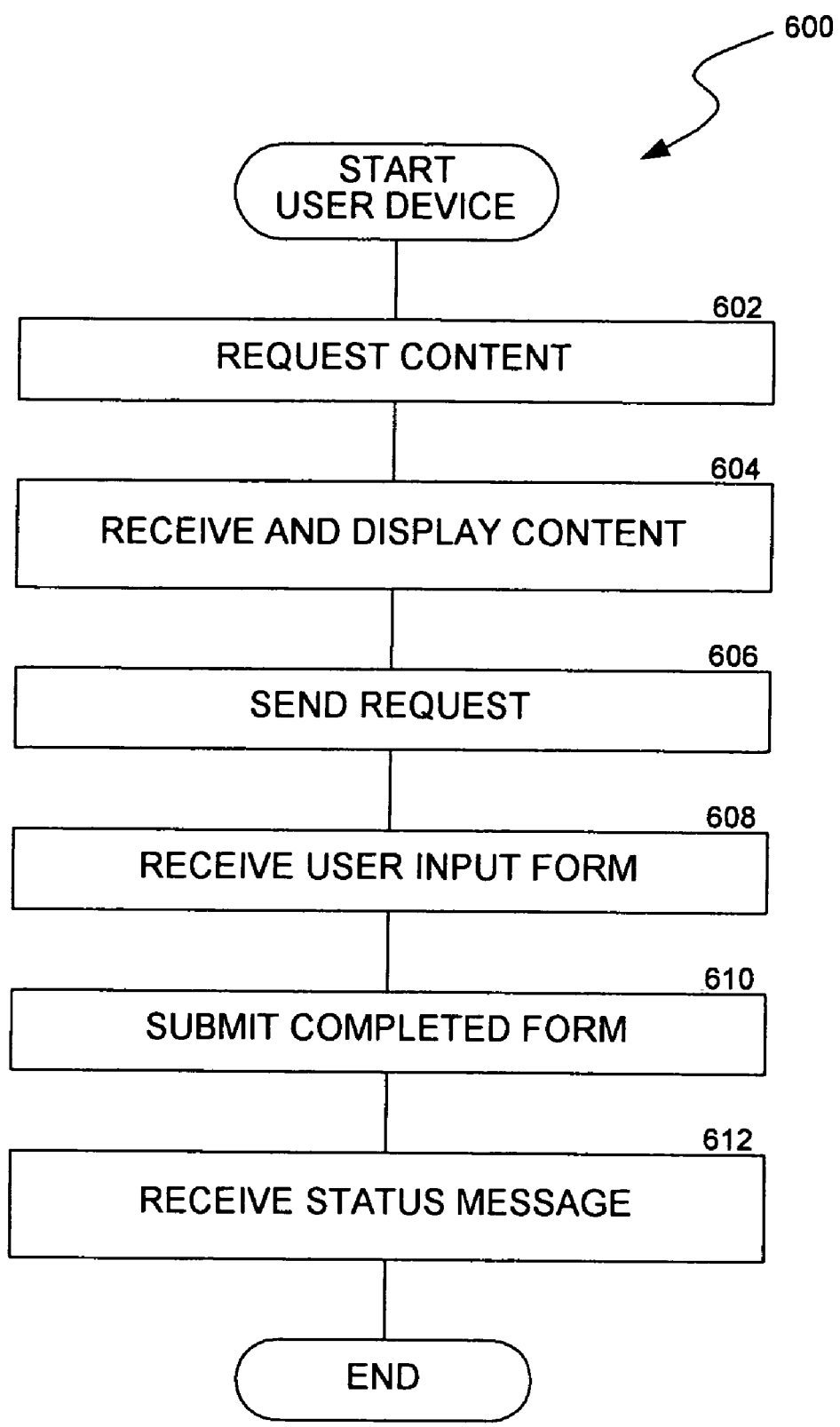
FIG. 6 is a flow diagram showing a routine for sharing content, where the routine is performed at the content sender device of FIG. 1.

Referring to FIG. 6, a routine 600 performed at the content sender device 116 begins at block 602 with the content sender device 116 requesting content. In some embodiments, the routine is performed on a mobile device as shown, for example, in the display diagrams of FIGS. 10 through 12. In some embodiments, the routine may also be performed on a PC or laptop via a standard web browser, as shown, for example, in the display diagrams of FIGS. 13 and 14. At block 604, the routine receives and displays the requested content, including a link that enables the content to be shared with a friend. At block 606, in response to a user selecting the "send to friend" link within the content page or application (e.g., Java application, WAP application, etc), the routine enables the link, adding appropriate dynamic parameters (e.g., user title, url). At block 608, the content sender device 116 receives a completed user input form from the share content application 104. An example of this is illustrated in FIGS. 11 and 14, and described below. If the content provider failed to provide appropriate parameters in the form or another error occurred, the content sender device 116 may alternatively receive an error message. At block 610, the user enters the phone number (MSISDN) and, optionally, the name of the friend and submits the form to the share content application 104. At block 612, the content sender device 116 receives a status message indicating the status of the share content transaction. An example of this is illustrated in FIG. 14.

Figure 7:
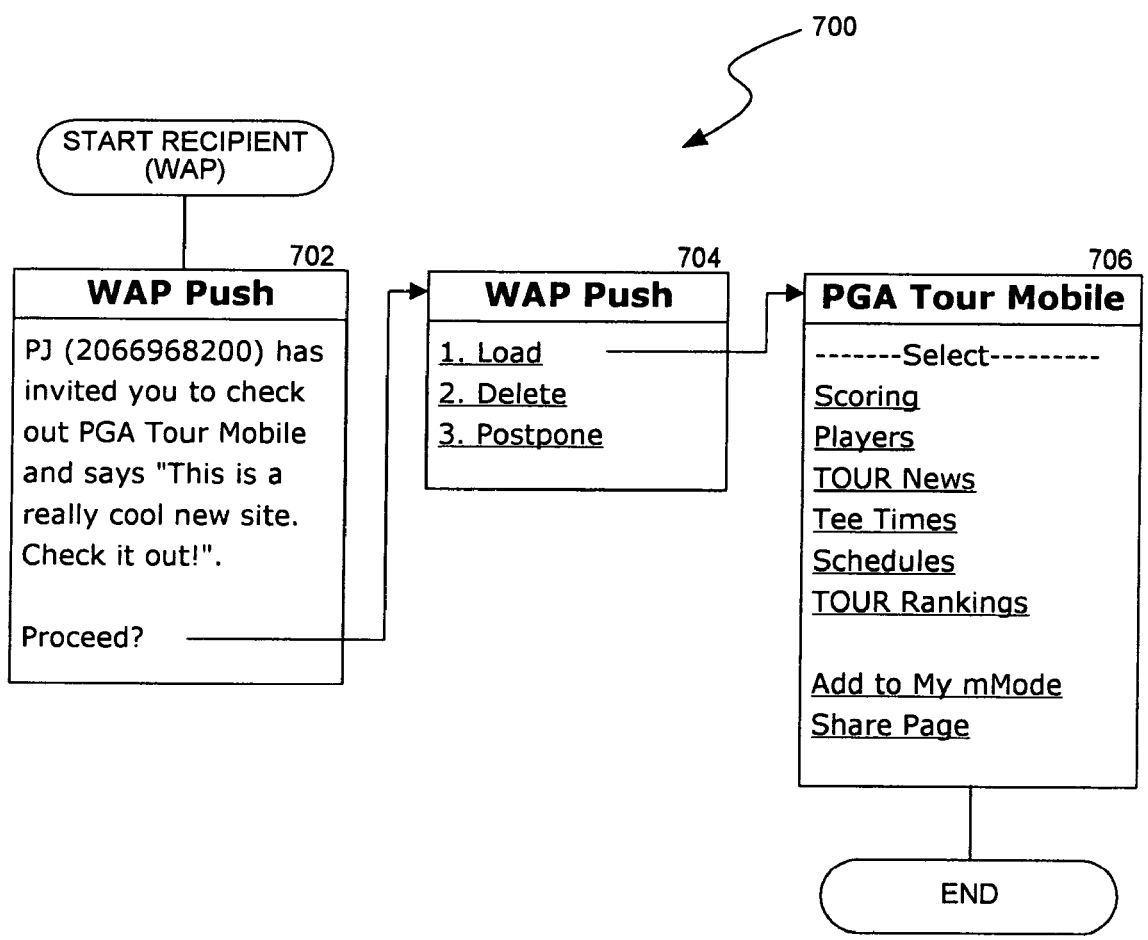
FIG. 7 is a flow diagram showing a routine for receiving a WAP push message containing information about shared content, where the routine is performed at the content recipient device of FIG. 1 in one embodiment.

Referring to FIG. 7, a routine 700 performed at a WAP-enabled content recipient device is illustrated, including associated displays. At block 702, the recipient device receives a WAP push alert notifying the recipient of the content. In some embodiments, the message text is generic and will include the sender's name (if entered) and MSISDN, and the name of the page or content being sent. In other embodiments employing WAP push messages, the system supports the ability to enter a custom message. At block 704, the recipient device displays options for allowing the recipient to load, postpone, or delete the content. At block 706, in response to recipient input to load the content, the recipient device loads the content for access by the recipient. Use of the WAP push makes it convenient for the recipient to load the URL directly from the push message.

Figure 8:
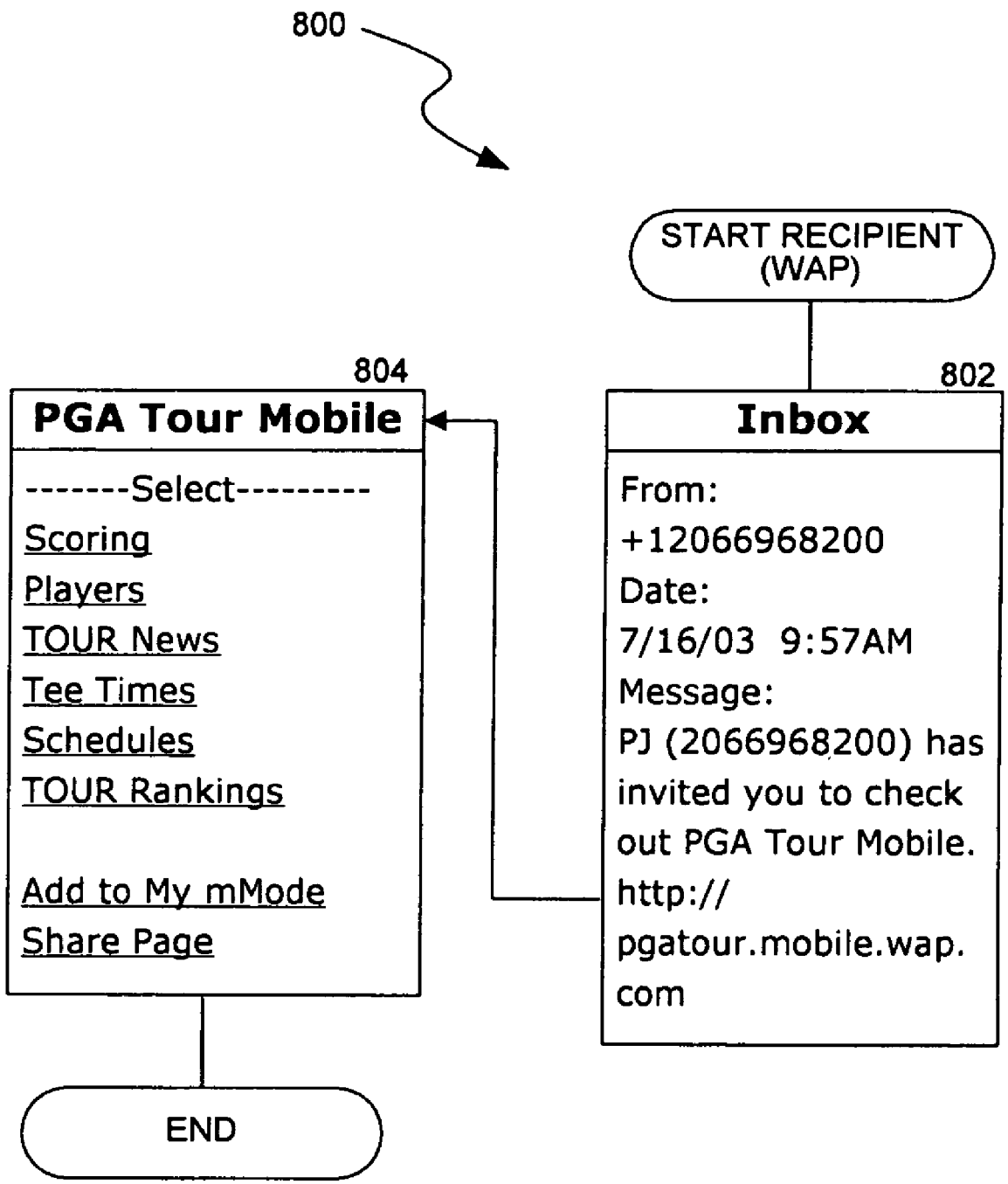
FIG. 8 is a flow diagram showing a routine for receiving an SMS message containing information about shared content, where the routine is performed at the content recipient device of FIG. 1, in one embodiment.

Referring to FIG. 8, as shown in the SMS routine 800, if the recipient device does not support WAP push, the recipient may receive an SMS message 802 telling them that someone has sent them a page to check out. On certain devices (e.g., NEC 515) the recipient may be able to load the content URL via the SMS message by using an arrow key and hitting enter. The content page 804 is then displayed. One skilled in the art would understand that the routines described with respect to FIGS. 7 and 8 are examples, and that other routines for providing share content messages could be used without departing from the scope of the invention.

Figure 9:
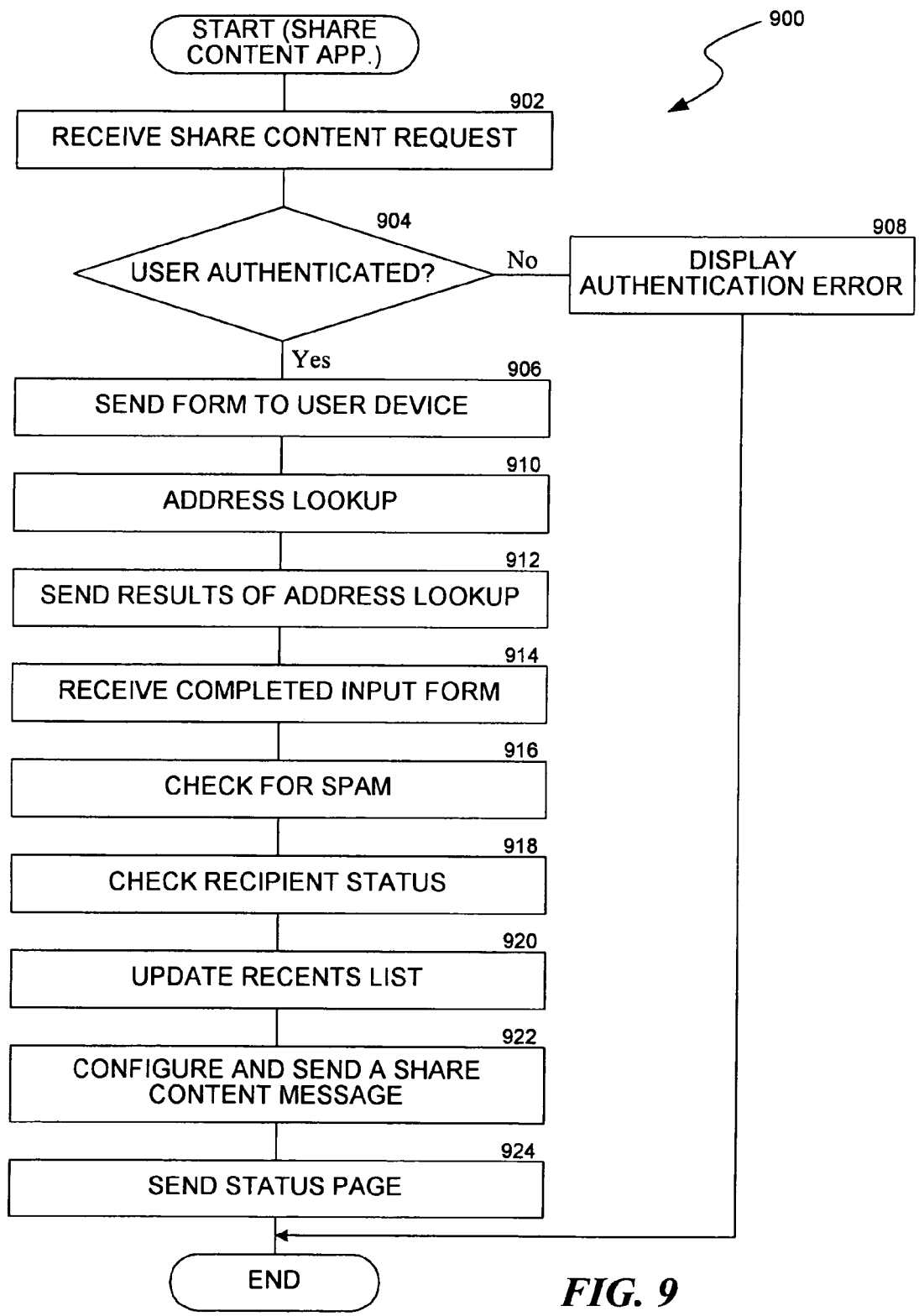
FIG. 9 is a flow diagram showing a routine for distributing shared content, where the routine is performed at the share content application of FIG. 1.

Referring to FIG. 9, a routine 900 performed at the share content application 104 begins at block 902, where the share content application 104 receives a share content request including parameters provided by the content provider application 102 (and possibly the user device 116) via the share link.

At decision block 904, the routine authenticates the user of the content sender device 116 from which the share content request originated. If at decision block 904 the authentication of the user is successful, the routine continues at block 906, where the routine sends a user input form to the content sender device 116. If at decision block 904 the authentication of the user fails, the routine continues at block 908, where the routine sends an authentication error message instead of the user input form and the routine ends. The user may also see this form if the content provider 102 fails to provide certain parameters (e.g., Url or Surl).

At block 910 the routine performs an optional address book lookup. During this process, the routine may invoke the address book application 112, which performs a query of the database 114 and provides results to the share content application 104. At block 912, the routine sends results of the address book lookup to the content sender device 116 so it can be displayed to the user and the user can select or enter the appropriate entries. At block 914, the routine receives the completed input form. At block 916, the routine may check for spam. At block 918, the routine checks the recipient status to determine whether each specified content recipient 118 subscribes to a service associated with the share content application 104 or is a cross-carrier recipient. At block 920, a "recents" list may be updated with current recipient information. At block 922, the routine communicates with various gateway components to configure and send a share content message to each of the eligible content recipient devices 118. At block 924, the routine sends a status page to the content sender device 116. This may include return URL information so that the user can automatically be taken back to the content that the user originally selected for sharing.

IV. Application Program Interface and Platforms

In some embodiments, the share content application may be associated with an API (application program interface) that allows content providers to easily create "links" or other functionality that facilitates sharing of content and applications. In some embodiments, share links may be placed within the content itself, or be somehow otherwise available through the content or application. Such links may be in the form of an HTTP GET request, which may use the URL itself to send information (e.g., application name, application URL, return URL, etc.) to the share content application. An example of such a request is as follows:

http://wireless.mobile.wirelesscarrier.net/p2p?msisdn=2065551212&app_name=CoolGame&app_url=http://www.coolgame.com/coolgame.wml&return_url=http://www.coolgame.com In the above example, the URL begins with an indication of the protocol in use ("http") followed by the host name "wireless.mobile.wirelesscarrier.net" followed by the "p2p" path name. The information provided following the "?" is the information sent as part of the GET request. In the above example, this information includes the MSISDN of the content sender device (2065551212) and the application name (name for the content, "Cool Game"), the application URL (www.coolgame.com/coolgame.wml), and a return URL (www.coolgame.com). The application URL takes the friend or recipient to content upon receipt of the message, while the return URL takes the user back to the content after the share content request process is complete. The application URL and the return URL may be the same or different. For example, if a content provider wants to route all new visitors to a home page, the application URL may be the home page, whereas the return URL may be the page from which the user selected the share content link. In the above example, the information passed in the GET request may be configured statically, with only the MSISDN added at run time. Depending on the technique used for sharing the information, other information can be added to the GET request at run time, such as the sender's name/message, the friend's MSISDN, etc. Some of the parameters that can be passed in a GET request are described in more detail in Table 1 below.

TABLE 1

| Parameter | Description |
|---|---|
| url | The URL of the content that is being shared. This is also the generic URL in case the surl is specified. In some embodiments, this parameter is needed when surl is not specified. |
| surl | The specific URL of the content that is being shared. The friend receives the surl in the push message when the friend's device belongs to the user's device class. If this parameter is not specified irrespective of the device of recipient, url is shared. |
| title | Title of the content to be shared |
| returnurl | The URL to which the sender is returned after the user is done sharing the content. When returnurl is not specified, surl is used. When surl and returnurl are not specified, the value of url is used to return the user. |
| cc | Indicates whether the content provider is interested in sending the SMS message to a cross-carrier friend of the user. If this value is set to "y" an SMS message is sent to cross-carrier friends with the value for url in the message. A missing cc parameter or any other value other than "y" would mean this URL will not be shared with the cross-carrier friend. |

V. User Interface

As described in the flow charts above, the content sharing system may include various user screens, views, and other interfaces that allow users to experience and share content and applications. Examples of such screens are described with respect to FIGS. 10 through 14. While only certain examples are given, a person skilled in the art will appreciate that many other interfaces could be implemented without departing from the scope of the invention. The terms "screen," "window," and "page" are generally used interchangeably herein. The pages described herein may be implemented using, for example, WML (wireless markup language), XHTML (extensible hypertext markup language), XML (extensible markup language), or HTML (hypertext markup language). In some embodiments, WML and XHTML decks offer similar functionality but may differ with respect to style guide and design requirements between the two languages (use of color, icons, etc.). The look and feel of WML pages are primarily text-based, with underlining used to highlight clickable links. XHTML is a richer development language, allowing the mobile device to present content that may stand out on many different levels. For example, XHTML may allow the use of front and background colors, bolding, and icons.

The screens or web pages provide facilities to receive input data, such as a form with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein. The pages or screens are stored and/or transmitted as display descriptions, as graphical user interfaces, or by other methods of depicting information on a screen (whether personal computer, PDA, mobile telephone or other) where the layout and information or content to be displayed on the page is stored in memory, database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

In general, for ease in describing features of the invention, aspects of the invention will now be described in terms of a user interacting with the server computer via his or her user computer. As implemented, however, the user computer receives data input by the user and transmits such input data to the server computer. The server computer then queries the database, retrieves requested pages, performs computations, and/or provides output data back to the user computer, typically for visual display to the user.

Figure 10:
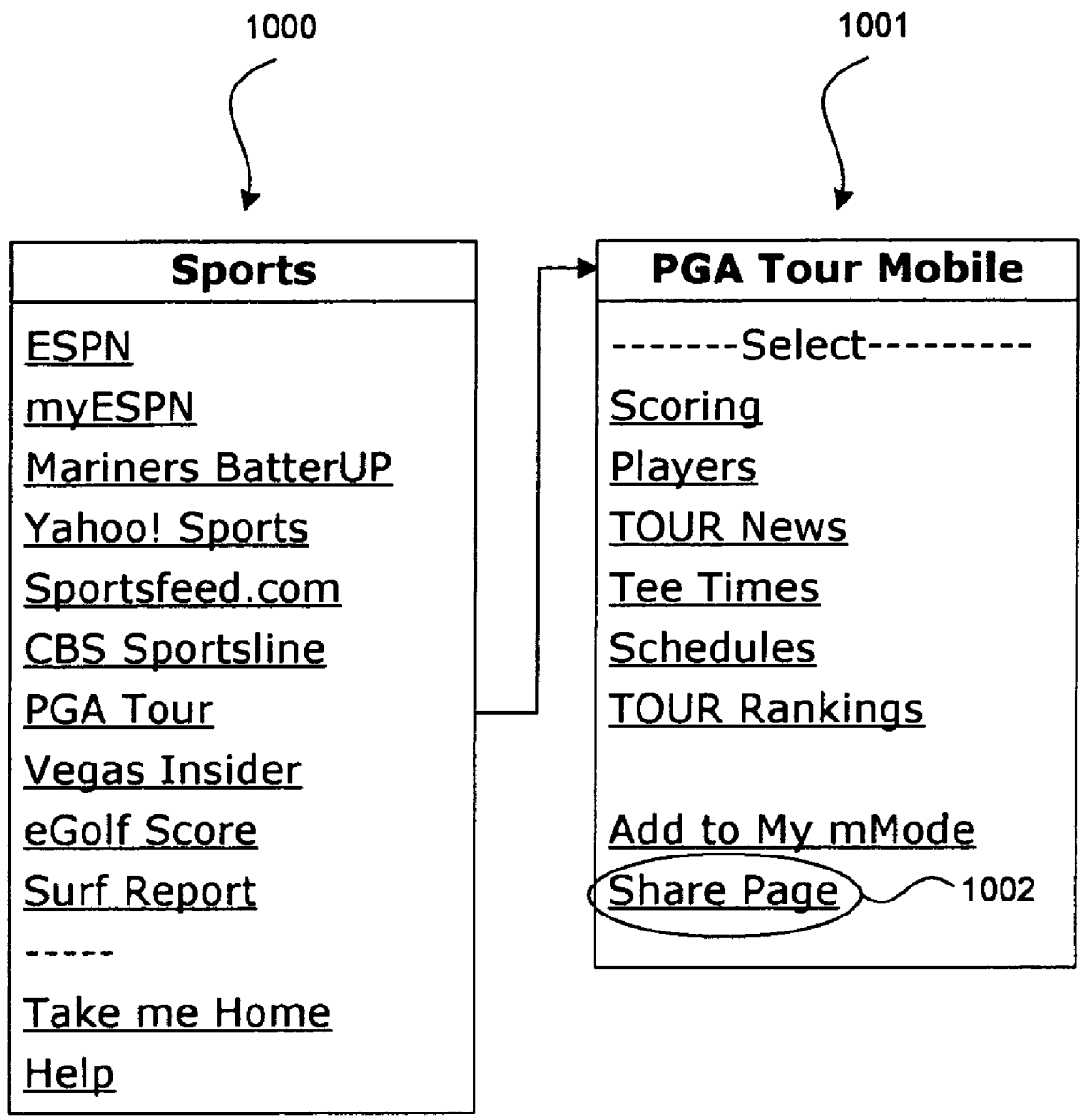
FIG. 10 is a display diagram showing screens from which a user of the content sender device of FIG. 1 (e.g., a WAP-enabled device) may select content to share.
Figure 11:
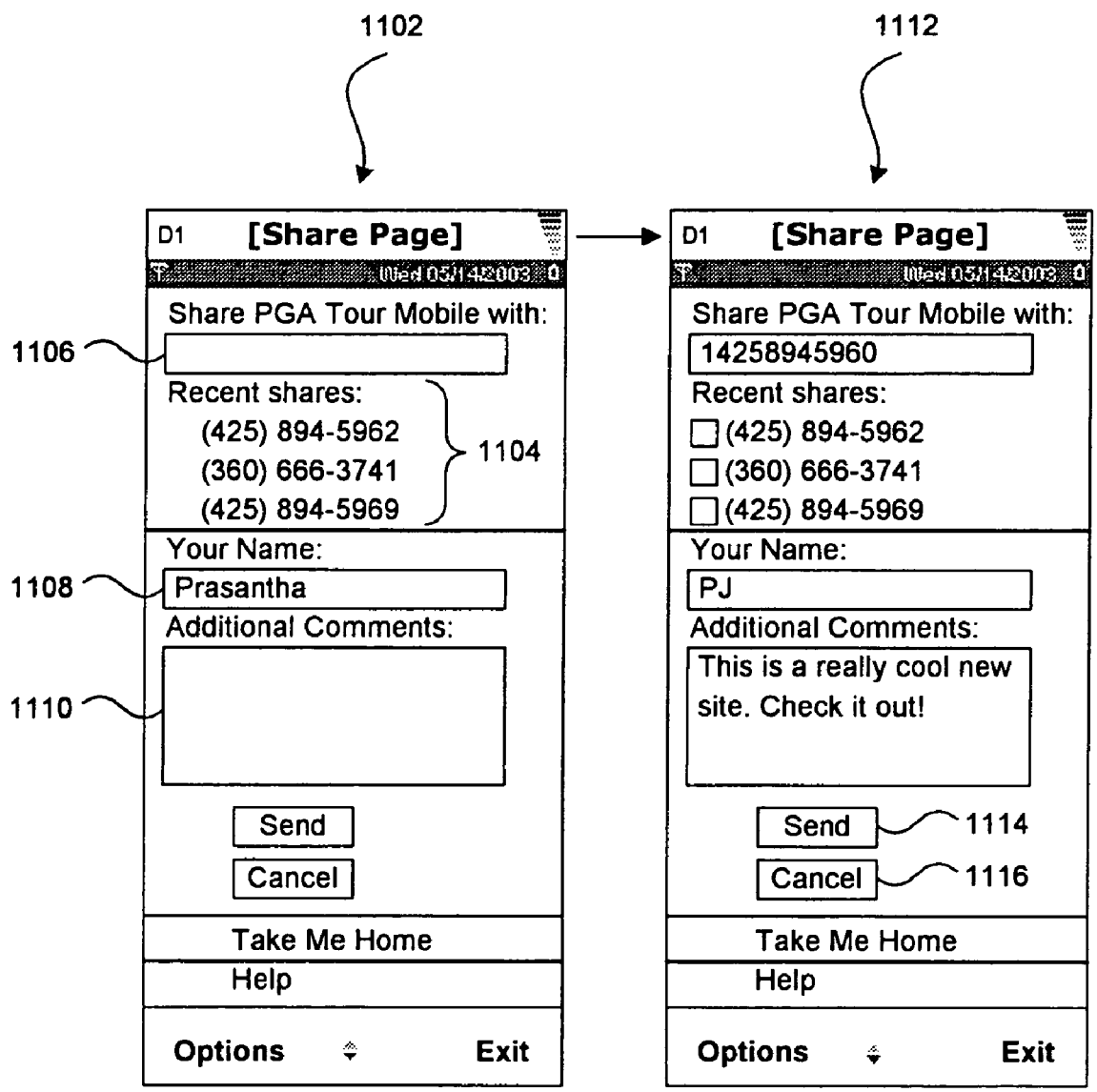
FIG. 11 is a display diagram showing input forms sent to a user of the content sender device of FIG. 1, so that the user may specify recipients with whom to share content.

Referring to FIG. 10, a user of a content sender device 116 starts at a content screen 1000 listing various links in this example, and proceeds, via a selected link, to a "PGA Tour" screen 1001 especially configured for mobile devices. By selecting a Share Page link 1002 at the bottom of the PGA Tour screen 1001, the user can initiate the process of sending the content (e.g., the PGA Tour screen 1001) to one or more friends.

Referring to FIG. 11, the content sender device 116 displays an example of an input form 1102 as would be shown on a screen of a mobile device. The input form 1102 allows the user to provide information so that the user can share the content with others. The content sender device 116 displays this form 1102 after the user selects the Share Page link 1002 of FIG. 10, causing the content provider 102 to send an HTTP GET request to the users mobile service provider, as described above. The input form 1102 includes several fields designed to provide information or to allow the user to provide information. For example, a list of "recent shares" 1104 may be displayed under the assumption that the user would like to share content with the same people the user has shared content with in the past. The form 1102 may also include a field 1106 for the user to provide the name or phone number (MSISID) of another person. The form may include a name field 1108 pre-filled with the users name, as well as a text box 1110 for the user to type a message. As shown in screen 1112, the user may update the name field 1108 as desired. While not shown in the illustrated example, in some embodiments, the user may identify more than one person with whom to share the content.

The screen 1112 shows the form as it may appear after the user has completed it by filling in the various fields. At this point, the user may submit the form to the share content application 104 by selecting a send button 1114 or may cancel the process by selecting a cancel button 1116.

Figure 12:
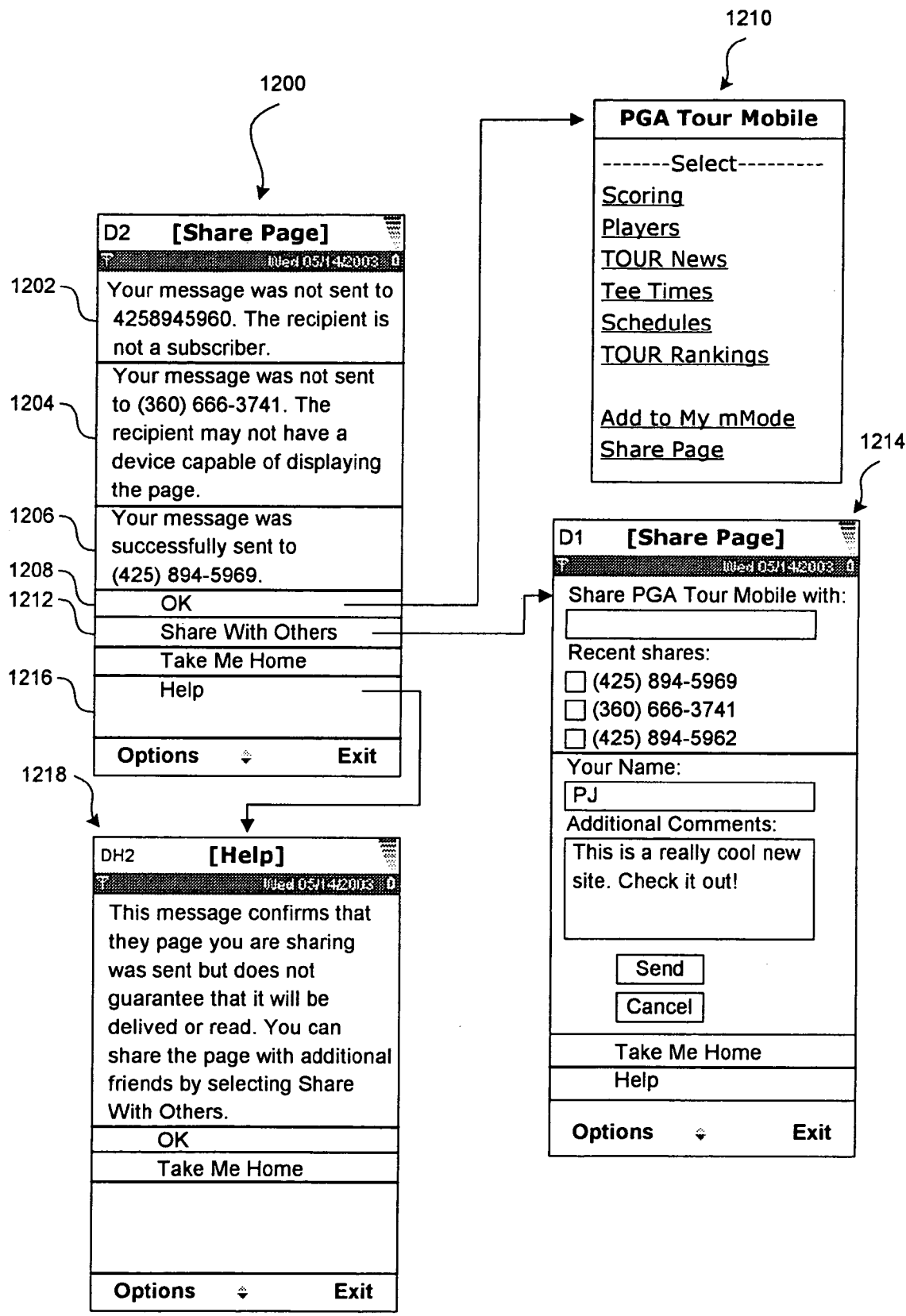
FIG. 12 is a display diagram showing various messages for the user of the content sender device of FIG. 1, so that the user may determine the outcome of the request to share and request other services.

Referring to FIG. 12, a display diagram/flow depicts various messages and results that a user may receive on the content sender device 116 after the user has submitted an input form, such as the input form 1102. In a screen 1200, the device displays three messages each corresponding to a contact with whom the user attempted to share content. A message 1202 indicates that the content was not sent to one of the desired recipients because that recipient was not a subscriber to the wireless carrier to which the user subscribes. This type of message 1202 is only displayed in systems that do not support cross-carrier content sharing. A second message 1204 indicates that the content was not sent to one of the desired recipients because that recipient did not have a device capable of displaying the content. A third message 1206 indicates that the content was successfully sent to one of the desired recipients.

From the screen 1200, the user can select an OK button 1208 to return to a screen 1210 showing the content that the user initially intended to share. Alternatively, the user may select a Share With Others button 1212 to return an input form screen 1214 from which the user can identify additional users with whom to share the content, similar to the input form 1102 of FIG. 11. The user may also select a Help button 1216 to view a help screen 1218 that shows additional information about the sharing process that the user may find helpful.

Figure 13:
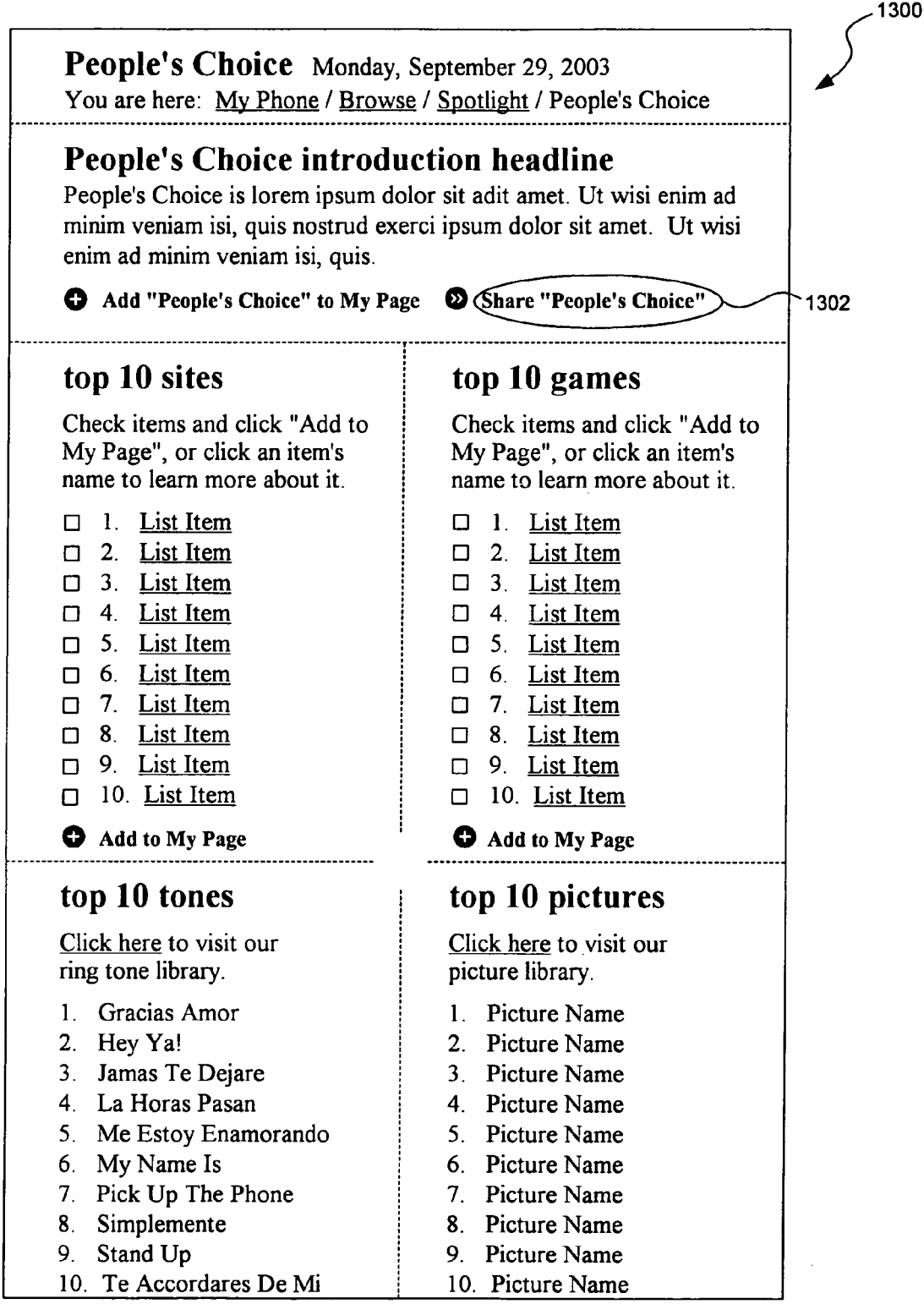
FIG. 13 is a display diagram showing a screen displayed on a more full-size screen of a computer device from which a user may select content to share with users of mobile devices.
Figure 14:
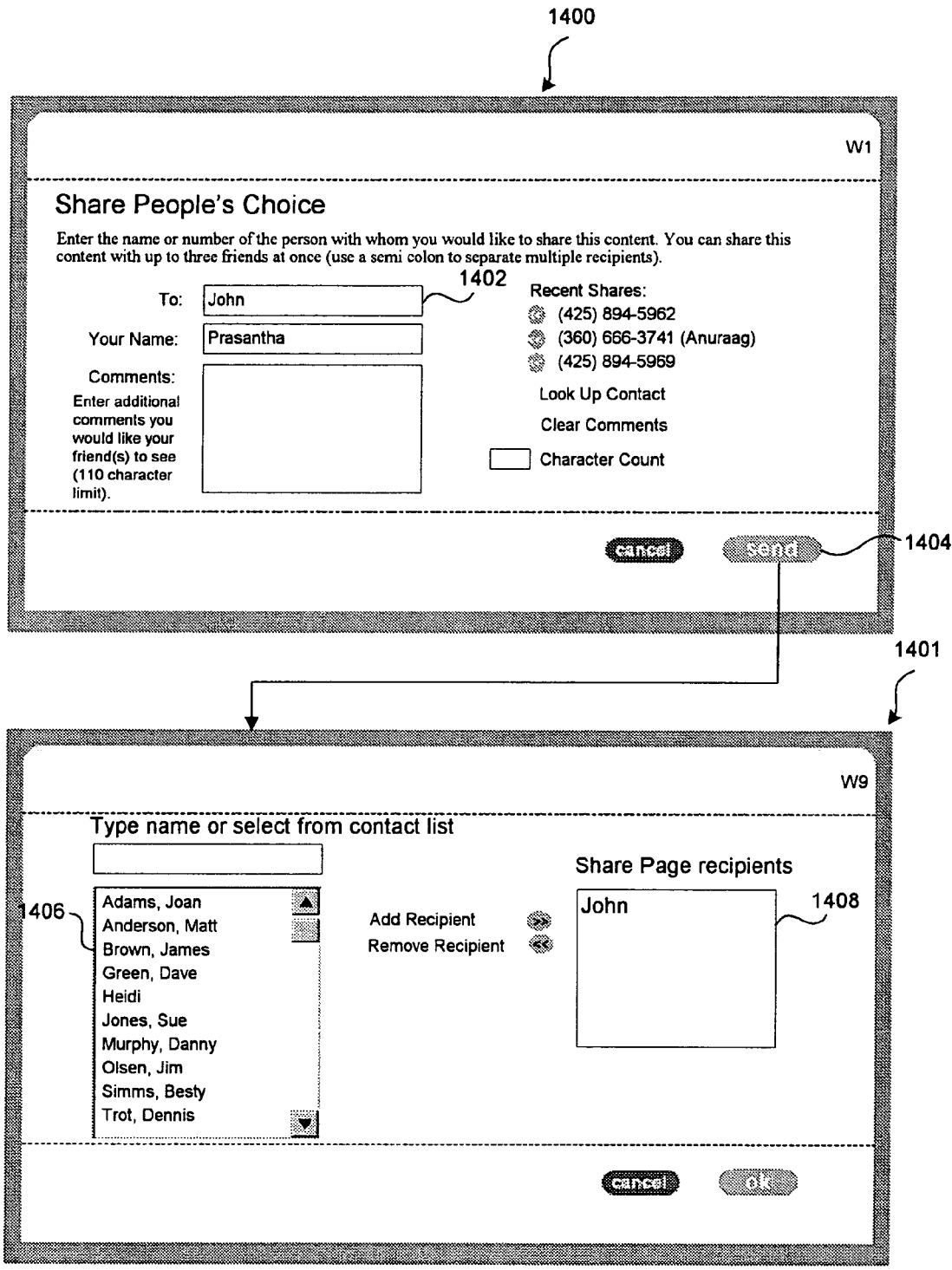
FIG. 14 is a display and flow diagram showing screens displayed on the full-size screen of the computer device from which a user may specify recipients with whom to share content.

Referring to FIGS. 13 and 14, in some embodiments, the user can use a PC, laptop, or similar device to share content. This configuration will generally offer the same functionality as when a mobile or similar device is used. For example, from a content screen 1300 of FIG. 13, the user will be able to select a share link 1302. The user may then be taken to an input form, such as the input form 1400 of FIG. 14. Like the input form 1102 displayed on the mobile device screen, this input form allows the user to provide information so that the user can share the content with others. Because the screens on such devices may be larger and the devices themselves may have more capabilities (especially I/O capabilities), a user sending content from PCs and laptops may experience added features. In addition, the differences in "look and feel" because the techniques for connecting to the share content application may vary depending on the type of device used, other differences may be present in the experience of the PC user, as opposed to the wireless user.

FIG. 14 also shows an address list lookup performed by an address book application. While not illustrated, this address book lookup may also be available to users of mobile devices. When using the address book lookup feature, the user begins at the input screen 1400 and enters a name (e.g., John) into a field 1402. When the user select the send button 1404, the user can then view a list of names 1406, as shown on an address lookup screen 1401. From this list of names 1406, the user can add or remove a recipient from a list of recipients 1408.

Figure 15:
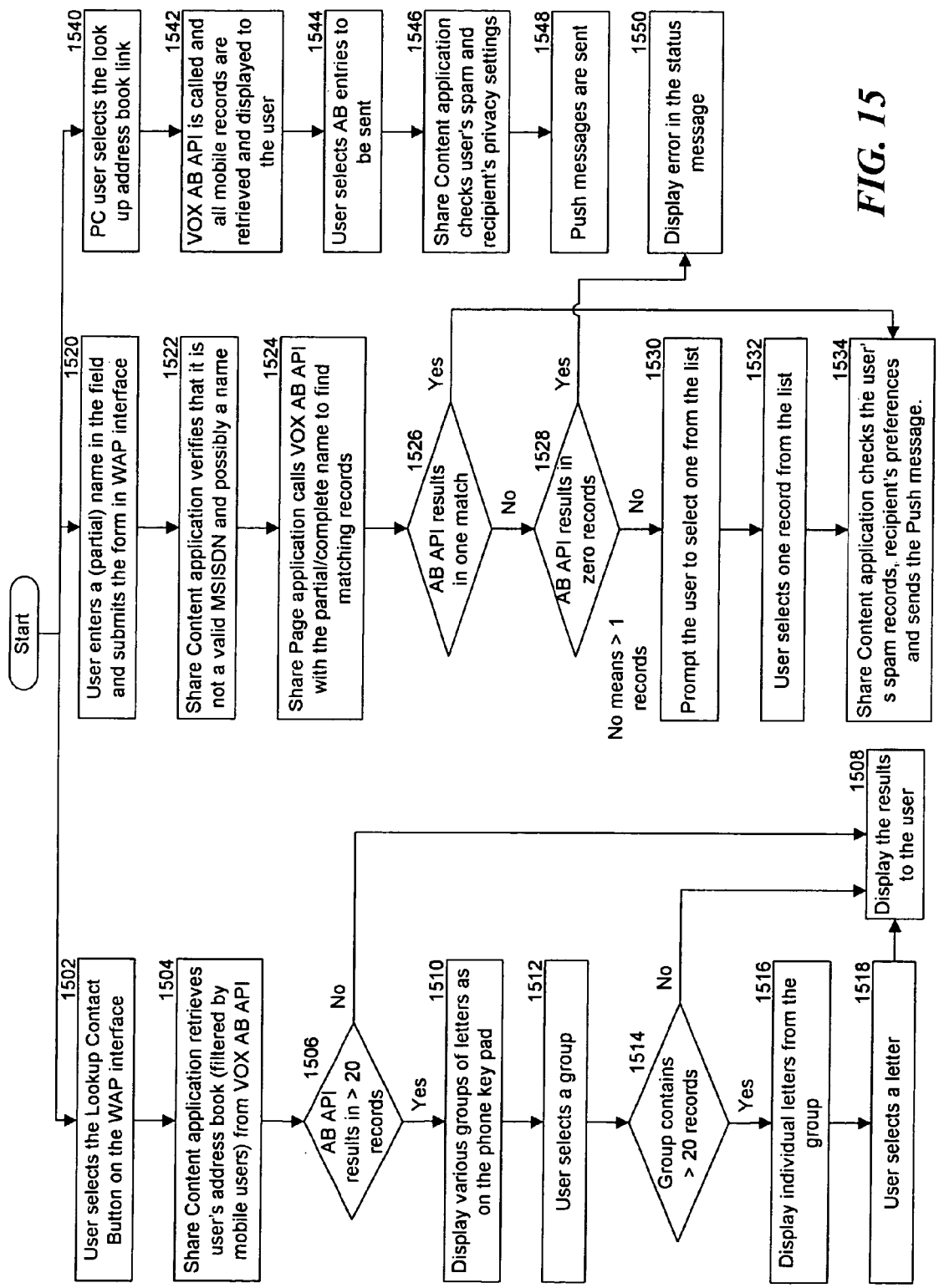
FIG. 15 is an interface call flow diagram for an address book lookup showing various transactions performed in response to user input.

Referring to FIG. 15, an address book interface call flow shows various functionalities performed at the content provider and at the user's device when the user attempts to invoke the address book application 112 of FIG. 1. In some embodiments, the functionality is different depending on whether the user accesses the address book from a PC or from a WAP-enabled device. On WAP devices, calls may vary depending on input from the user. For example, in blocks 1502 through 1518, the user is performing a lookup via a contact button on a WAP interface. In blocks 1520 through 1534, the user is performing a lookup by entering a partial name in a field and submitting the form via the WAP interface. In blocks 1540 through 1550, the user is on a personal computer and has selected a lookup address book link from a web page (as illustrated in FIG. 14).

Beginning at block 1502, the user selects the lookup contact button on a WAP interface. At block 1504, the share content application retrieves the user's address book from an address book (AB) API. At decision block 1506, if the address book API retrieves less than 20 records, the call flow continues at block 1508, where the results are displayed to the user. If, however, at decision block 1506 the retrieval results are greater than 20 records, the call flow continues at block 1510 where the user's device displays various groups of letters. These letters may correspond to letters on the user's phone keypad. At block 1512, the user selects a group from the group of letters.

The call flow continues at decision block 1514. If at decision block 1514 the selected group contains less than 20 records, the call flow continues at block 1508 where the user's device displays the results. If, however, at decision block 1514 the selected group contains more than 20 records, the call flow continues at block 1516 where the individual letters from the group are displayed on the user device. At block 1518, the user selects a letter (e.g., using the phone keypad). The routine ends after block 1518 where the routine displays the results to the user.

Blocks 1520 through 1534 are associated with a call flow at a WAP-enabled device where a user enters a partial name in a field and submits the form in the WAP interface. At block 1520, the user enters the name in the field and submits the form. The name may be in partial form so that the user does not have to enter the entire first and last name of the selected recipient. At block 1522, the share content application verifies that the entered name is not a valid MSISDN and is instead a name. At block 1524 the share content application calls the address book API with the partial or complete name to identify matching records. At decision block 1526, if the address book API results in exactly one match, the call flow continues at block 1534, where the share content application checks the user's spam records and the recipient's preferences and sends the push message to the recipient. If, however, at decision block 1526 the API does not result in exactly one match, the call flow continues at decision block 1528 where the call flow checks whether there are zero records in the API results. If there are zero records in the API results, the call flow continues at block 1550 where the call flow displays an error in the status message. If, however, at decision block 1530 there are not zero records, meaning there is more than one record, then the call flow continues at block 1530 where the share content application prompts the user to select one of the records from the list. At block 1532, the user selects one record from the list. At block 1534, the share content application checks the user's spam records and the recipient's preferences and sends the push message.

Referring to blocks 1540 through 1548 of FIG. 15, the user may perform a network-based address book functionality from a PC. In this case, the call flow begins at block 1540 where the PC user selects the lookup address book link. At block 1542, the network-based address book API is called and all known records are retrieved and displayed to the user. At block 1544, the user selects one or more address book entries as the recipient(s). At block 1546, the share content application checks the user's spam and the recipient's privacy settings. At block 1548, one or more push messages are sent and the call flow ends.

VI. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps or employ systems having blocks in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or at different times. Where the context permits, words in the above Detailed Description using the singular or plural number may also include the plural or singular number, respectively, where the context permits.

The teachings of the invention provided herein can be applied to other systems, not necessarily only the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the content sharing system may vary considerably in its implementation details, while still being encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. In a telecommunications system having at least one network gateway coupled among multiple mobile devices and a network, and wherein a content sharing system and a content provider are also coupled to the network, a method of sharing content between a user and a recipient, both of whom have a mobile device having access to the network, the method comprising:

receiving a request message, wherein the request message is generated, at least in part, by the content provider, the request message comprising:

information identifying the content sharing system, and information identifying content provided by the content provider, wherein the user selected the identified content as content that the user wishes to share with the recipient;

providing a user input form for display to the user, wherein the user input form includes a request for the user to identify the recipient;

receiving user input information comprising a recipient telephone number submitted by the user via the user input form;

determining, at the content sharing system, that a recipient device is not capable of rendering the content, and responsive thereto selecting an alternate content link;

determining, at the content sharing system, whether the recipient is a subscriber to a service associated with the content sharing system based on the recipient telephone number; and generating a content share message comprising the alternate content link for transmittal to the mobile device of the recipient, wherein the content share message includes an indication of the identified content that the user wishes to share with the recipient, wherein, if the recipient is the subscriber to the service associated with the content sharing system, generating the content share message in a first protocol, and if the recipient is not the subscriber to the service associated with the content sharing system, generating the content share message in a second protocol.

2. The method of claim 1 wherein the user selected the identified content from the mobile device of the user.

3. The method of claim 1 wherein the user selected the identified content from a device other than a mobile device.

4. The method of claim 1 wherein the content sharing system is associated with a wireless carrier and wherein the wireless carrier provides mobile service for the mobile device of the recipient.

5. The method of claim 1 wherein the content sharing system is associated with a wireless carrier and wherein the wireless carrier does not provide mobile service for the mobile device of the recipient.

6. The method of claim 1 further comprising providing access to an address book application coupled to the content sharing system, wherein the address book application facilitates the user's identification of the recipient.

7. The method of claim 1 further comprising authenticating the user.

8. The method of claim 1 further comprising authenticating the recipient.

9. The method of claim 1 further comprising determining whether the user has exceeded a predetermined threshold for sharing content.

10. The method of claim 1 wherein the user input form provided for display to the user includes a listing of a predetermined number of recipients with whom the user recently shared content.

11. The method of claim 1 wherein the received request message is in the form of an HTTP GET request.

12. A mobile device registered with a mobile service provider, the mobile device comprising:
  means for receiving user input;
  means for providing output;
  memory means;
  radio transceiver and processing means coupled to the memory means; and wherein the mobile device is smaller than a laptop or tablet computer, and further comprises:
  means for presenting content via an output component of the mobile device, wherein the content is provided by a content provider and includes a user-selectable option to facilitate sharing the content with other mobile device users;
  means for sending a request message to a content sharing system, wherein the request message is based on information associated with the user-selectable option, the request message comprising information identifying the content sharing system and information identifying content provided by the content provider;
  means for receiving a user input form from the content sharing system, wherein the user input form is configured to obtain user input identifying recipients for the shared content; and
  means for sending information associated with a completed user input form comprising recipient telephone numbers to the content sharing system;
  wherein the content sharing system determines based on the recipient telephone numbers that recipient devices are not capable of rendering the content and responsive thereto selects an alternate content link, and whether each of the identified recipients is a subscriber to a service associated with the content sharing system, wherein
  if an identified recipient is the subscriber to the service associated with the content sharing system, generating a content share message comprising the alternate content link for the identified recipient in a first protocol, and
  if the identified recipient is not the subscriber to the service associated with the content sharing system, generating the content share message comprising the alternate content link for the identified recipient in a second protocol.

13. The mobile device of claim 12 further comprising means for, after sending the information associated with the completed user input form, receiving a message indicating the status of the request sent to the content sharing system and a return address that links directly to the content.

14. The mobile device of claim 12 further comprising means for, after sending the information associated with the completed user input form, representing the content via the output component.

15. The mobile device of claim 12 further comprising means for presenting information from an address book application, wherein the address book application facilitates the identifying of recipients for the shared content in combination with the user input form.

16. The mobile device of claim 12 wherein the largest dimension of the mobile device is smaller than twelve inches or wherein the mobile device does not have a full size keyboard that can accommodate both hands of a user.

17. At a content provider system, a method of sharing content among users of mobile devices interconnected within one or more mobile telecommunication networks, wherein at least some of the users subscribe to a mobile service provided by a mobile service provider, the method comprising:
  generating a user-selectable share content option as part of content available for access by users of mobile devices, wherein the user-selectable share content option facilitates sharing the content with other users of mobile devices, and wherein the user-selectable share content option is based on an application program interface provided in association with a content sharing application of the first mobile service provider;
  providing the content, including the user-selectable share content option, to a device of a user, wherein the content can then be shared with a recipient device via the content sharing application of the first mobile service provider;
  receiving a request to share the content with the recipient device, the request comprising information identifying the content sharing application, and information identifying the content, wherein the user selected the content as content that the user wishes to share with the recipient;
  providing a user input form for display to the user, wherein the user input form includes a request for the user to identify the recipient;
  receiving user input information comprising a recipient telephone number submitted by the user via the user input form;
  determining, based on the recipient telephone number, that the recipient device is not capable of rendering the content, and responsive thereto selecting an alternate content link;
  determining, based on the recipient telephone number, whether the recipient device is a subscriber to the content sharing application of the first mobile service provider; and
  based on the determination of whether the recipient device is the subscriber to the content sharing application of the first mobile service provider, generating a content share message comprising the alternate content link for transmittal to the recipient device, wherein
  if the recipient device is the subscriber to the content sharing application of the first mobile service provider, generating the content share message in a first protocol, and
  if the recipient device is not the subscriber to the content sharing application of the first mobile service provider, generating the content share message in a second protocol.

18. The method of claim 17 wherein the user-selectable share content option is implemented as a link that, when selected, results in the request being sent to the content sharing application of the first mobile service provider.

19. The method of claim 17 wherein the content available for access by users of mobile devices is an executable application.

20. The method of claim 17 wherein the content available for access by users of mobile devices is an executable MIDP application.

21. A wireless service provider system for facilitating the sharing of content among mobile devices via one or more networks, the system comprising:
   a server computer;
   a database coupled to the server computer;
   a content sharing application running on the server computer and having access to the database, wherein the content sharing application receives and processes requests to share content among the mobile devices, and wherein the requests are received from customers of the wireless service provider system and comprise information identifying the content sharing application and information identifying the content, wherein the customers selected the identified content as content that the customers wish to share with the recipient;
   wherein the content sharing application provides a user input form for display to the customers of the wireless service provider system, the user input form comprising a request for the customers to identify the recipient, and receives user input information comprising a recipient telephone number submitted via the user input form; and
   multiple network gateways for facilitating the communication between the content sharing application and the mobile devices,
   wherein at least one of the multiple gateways is configured for facilitating communication between the content sharing application and the mobile devices via a mobile device telecommunication network,
   wherein at least one of the multiple gateways is configured for facilitating communication between the content sharing application and computing devices connected via a public communication network,
   wherein at least one of the multiple gateways is configured for determining that each of the mobile devices is not capable of rendering the content, and responsive thereto selecting an alternate content link for transmission to each of the mobile devices, and
   wherein at least one of the multiple gateways is configured for determining whether each of the mobile devices is a subscriber to a service associated with the content sharing application based on the recipient telephone number,
   wherein if each of the mobile devices is the subscriber to the service associated with the content sharing application, generating a content share message comprising the alternate content link in a first protocol, and
   wherein if each of the mobile devices is not the subscriber to the service associated with the content sharing application, generating the content share message comprising the alternate content link in a second protocol.

22. The system of claim 21 wherein the multiple network gateways include a mobile access gateway.

23. The system of claim 21 wherein the multiple network gateways include a push proxy gateway.

24. The system of claim 21 wherein the multiple network gateways include a short message peer-to-peer gateway.

25. The system of claim 21 wherein the multiple network gateways include a wireless service broker.

26. The system of claim 21 further comprising a cross-carrier application accessible by the content sharing application, wherein the cross-carrier application facilitates the sharing of content with recipients not registered with the content sharing application.

27. The system of claim 21 further comprising an address book application accessible by the content sharing application.

28. A non-transitory computer-readable medium containing a data structure for facilitating sharing of content among users of mobile devices, the data structure comprising:
   an indication of content to be shared, wherein the indication of the content to be shared is provided as a parameter associated with a user-selectable option on a display description provided by a content provider,
   wherein the indication of the content to be shared is received in a request message generated, at least in part, by the content provider, the request message comprising information identifying the content sharing application and information identifying content provided by the content provider, wherein a user selected the identified content as content that the user wishes to share with the recipient, and wherein an identity of a recipient device comprising a recipient telephone number is received in user input information generated by a user input form, wherein the user input form comprises a request for a user to identify a recipient; and
   a link associated with a server hosting the content sharing application, wherein the content sharing application receives information associated with the data structure as a result of a user selecting the user-selectable option on the provided display description,
   wherein the content sharing application determines that the recipient device is not capable of rendering the content and responsive thereto selects an alternate content link for transmission to the recipient device, and
   wherein the content sharing application determines whether the recipient device is a subscriber to a service associated with the content sharing system based on the recipient telephone number,
   wherein the content sharing application generates a content share message comprising the alternate content link for transmittal to the recipient device, wherein the content share message includes an indication of the identified content that the user wishes to share with the recipient, wherein,
   if the recipient device is the subscriber to the service associated with the content sharing application, generating the content share message in a first protocol, and
   if the recipient device is not the subscriber to the service associated with the content sharing application, generating the content share message in a second protocol.

29. The non-transitory computer-readable medium of claim 28 wherein the display description is implemented, at least in part, in HTML.

30. The non-transitory computer-readable medium of claim 28 wherein the display description is implemented, at least in part, in XML.

31. The non-transitory computer-readable medium of claim 28 wherein the display description is implemented, at least in part, in XHTML.

32. The non-transitory computer-readable medium of claim 28 wherein the display description is implemented, at least in part, in WML.

33. The non-transitory computer-readable medium of claim 28 further comprising an indication of uniform resource locator associated with the content to be shared.

34. The non-transitory computer-readable medium of claim 28 further comprising an indication of a specific uniform resource locator identifying an address for specific content to be shared.

35. The non-transitory computer-readable medium of claim 28 further comprising an indication of whether the content provider consents to providing access to the shared content to a cross-carrier user.

36. The non-transitory computer-readable medium of claim 28 further comprising an indication of a return uniform resource locator identifying the address of the display description to which the user will be returned after performing a process associated with identifying recipients with whom to share content.

37. A method for facilitating the sharing of content among users of mobile devices, the method comprising:

providing an application program interface for content providers, wherein the application program interface provides a framework for content providers to offer an option for customers of a wireless service provider to share information with mobile devices; and providing a content sharing application, wherein the content sharing application receives and processes requests comprising information identifying the content sharing application, and information identifying content provided by the content providers, wherein customers selected the identified content as content that the customers wish to share with the recipient, wherein the content sharing application provides a user input form for display to the customers, wherein the user input form includes a request for the customers to identify a recipient, wherein the content sharing application receives user input information comprising recipient telephone numbers associated with the mobile devices from the customers of the wireless service provider via the user input form, wherein the content sharing application determines that each of the mobile devices is not capable of rendering the content, and responsive thereto selects an alternate content link for transmission to each of the mobile devices, wherein the content sharing application determines whether each of the mobile devices is a subscriber to a service associated with the content sharing system based on a recipient telephone number associated with each of the mobile devices, and wherein the content sharing application generates a content share message comprising the alternate content link for transmittal to the mobile devices, wherein the content share message includes an indication of the identified content that the customers wish to share with the mobile devices, wherein, if each of the mobile devices is the subscriber to the service associated with the content sharing application, generating the content share message in a first protocol, and if each of the mobile devices is not the subscriber to the service associated with the content sharing application, generating the content share message in a second protocol.

38. The method of claim 37 further comprising charging a fee to the content providers for providing the option for the customers of the wireless service provider to share information with the mobile device users.

39. The method of claim 37 further comprising tracking attempts of the customers of the wireless service provider to share content with the mobile device users and charging a fee in association with the attempts.

40. The method of claim 37 further comprising providing incentives to customers of the wireless service provider to share content with the mobile device users.

* * * * *